(12) United States Patent
Back et al.

(10) Patent No.: US 8,882,265 B2
(45) Date of Patent: Nov. 11, 2014

(54) MULTIFOCAL CONTACT LENSES AND RELATED METHODS AND USES TO IMPROVE VISION OF PRESBYOPIC SUBJECTS

(71) Applicant: CooperVision International Holding Company, LP, St. Michael (BB)

(72) Inventors: Arthur Back, Danville, CA (US); Jianping Wei, San Ramon, CA (US)

(73) Assignee: CooperVision International Holding Company, LP, St. Michael (BB)

( * ) Notice: Subject to any disclaimer, the term of this patent is extended or adjusted under 35 U.S.C. 154(b) by 0 days.

(21) Appl. No.: 13/746,498

(22) Filed: Jan. 22, 2013

(65) Prior Publication Data

US 2013/0201444 A1 Aug. 8, 2013

Related U.S. Application Data

(60) Provisional application No. 61/594,842, filed on Feb. 3, 2012.

(51) Int. Cl.
*G02C 7/04* (2006.01)
*G02C 7/02* (2006.01)

(52) U.S. Cl.
CPC ............... *G02C 7/041* (2013.01); *G02C 7/027* (2013.01); *G02C 7/042* (2013.01); *G02C 7/044* (2013.01)
USPC .................................................. 351/159.05

(58) Field of Classification Search
CPC ................. G02C 7/04; G02C 7/041–7/045
USPC ....................... 351/159.05, 159.06
See application file for complete search history.

(56) References Cited

U.S. PATENT DOCUMENTS

| | | | |
|---|---|---|---|
| 5,220,359 A | | 6/1993 | Roffman |
| 5,611,970 A | * | 3/1997 | Apollonio et al. .............. 264/2.5 |
| 5,619,289 A | * | 4/1997 | Seidner et al. ........... 351/159.47 |
| 5,715,031 A | | 2/1998 | Roffman et al. |

(Continued)

FOREIGN PATENT DOCUMENTS

| | | |
|---|---|---|
| EP | 0201231 A2 | 11/1986 |
| GB | 2086605 A | 5/1982 |

(Continued)

OTHER PUBLICATIONS

International Search Report and Written Opinion dated Jun. 21, 2013 issued in corresponding International Application No. PCT/IB2013/000477 (10 pages).

(Continued)

*Primary Examiner* — Darryl J Collins
(74) *Attorney, Agent, or Firm* — Kilyk & Bowersox, P.L.L.C.

(57) ABSTRACT

Multifocal contact lenses and methods and uses are described. The multifocal contact lenses include an optic zone. The optic zone has an aspheric power profile that provides a near vision refractive power and a distance vision refractive power, and provides an Add power that corresponds to the difference between the near vision refractive power and the distance vision refractive power. The multifocal contact lenses can improve binocular vision of presbyopic subjects by being prescribed such that the non-dominant eye contact lens is over-corrected for distance vision, and both multifocal contact lenses are under-corrected for the Add power requirement of the subject. Batches and sets of multifocal contact lenses are also described.

20 Claims, 9 Drawing Sheets

(56) References Cited

U.S. PATENT DOCUMENTS

| | | | |
|---|---|---|---|
| 5,754,270 A * | 5/1998 | Rehse et al. | 351/159.47 |
| 5,771,088 A | 6/1998 | Perrott | |
| 5,835,192 A | 11/1998 | Roffman et al. | |
| 6,322,213 B1 | 11/2001 | Altieri et al. | |
| 6,520,638 B1 | 2/2003 | Roffman et al. | |
| 6,540,353 B1 | 4/2003 | Dunn | |
| 6,802,606 B2 | 10/2004 | Roffman et al. | |
| 7,178,918 B2 | 2/2007 | Griffin | |
| 7,517,084 B2 | 4/2009 | Wooley et al. | |
| 7,625,086 B2 | 12/2009 | Wooley et al. | |
| 7,753,521 B2 | 7/2010 | Wooley et al. | |
| 8,672,474 B2 | 3/2014 | Lindacher et al. | |
| 8,777,415 B2 | 7/2014 | Back | |
| 2004/0150790 A1 | 8/2004 | Roffman et al. | |
| 2007/0159593 A1 | 7/2007 | Hibino et al. | |
| 2009/0033864 A1 | 2/2009 | Shone et al. | |
| 2009/0051870 A1 | 2/2009 | Lindacher et al. | |
| 2009/0244478 A1 | 10/2009 | Wooley et al. | |
| 2010/0321632 A1 | 12/2010 | Sanger | |
| 2013/0201442 A1 | 8/2013 | Back | |
| 2013/0201443 A1 | 8/2013 | Back et al. | |
| 2013/0201454 A1 | 8/2013 | Back | |

FOREIGN PATENT DOCUMENTS

| | | |
|---|---|---|
| WO | 0008516 A1 | 2/2000 |
| WO | 0135880 A1 | 5/2001 |
| WO | 2009025808 A1 | 2/2009 |

OTHER PUBLICATIONS

Office Action received in U.S. Appl. No. 13/746,490 dated May 9, 2014 (16 pages).

Office Action received in U.S. Appl. No. 13/747,510 dated May 6, 2014 (28 pages).

* cited by examiner

High ADD Subjects (+2.00 D to +3.00 D)

FIG. 7

| Visual acuity scales | | | |
|---|---|---|---|
| Foot | Metre | Decimal | LogMAR |
| 20/200 | 6/60 | 0.10 | 1.00 |
| 20/160 | 6/48 | 0.125 | 0.90 |
| 20/125 | 6/38 | 0.16 | 0.80 |
| 20/100 | 6/30 | 0.20 | 0.70 |
| 20/80 | 6/24 | 0.25 | 0.60 |
| 20/63 | 6/19 | 0.32 | 0.50 |
| 20/50 | 6/15 | 0.40 | 0.40 |
| 20/40 | 6/12 | 0.50 | 0.30 |
| 20/32 | 6/9.5 | 0.63 | 0.20 |
| 20/25 | 6/7.5 | 0.80 | 0.10 |
| 20/20 | 6/6 | 1.00 | 0.00 |
| 20/16 | 6/4.8 | 1.25 | -0.10 |
| 20/12.5 | 6/3.8 | 1.60 | -0.20 |
| 20/10 | 6/3 | 2.00 | -0.30 |

30

32

34

|  | Dominant Eye | Non-dominant eye |
|---|---|---|
| Low ADD (up to +1.00 D) | Lens A    32A | Lens A    34A |
| Med Add (+1.25 D – +1.75 D) | Lens A    32B | Lens A    34B (overcorrected by +0.25 - +1.25 D; e.g., +0.75 D) |
| High Add (+2.00 D - +2.50 D) | Lens A    32C | Lens A    34C (overcorrected by +0.25 D - +1.25 D; e.g., +0.75 D or +1.00 D) |

FIG. 8

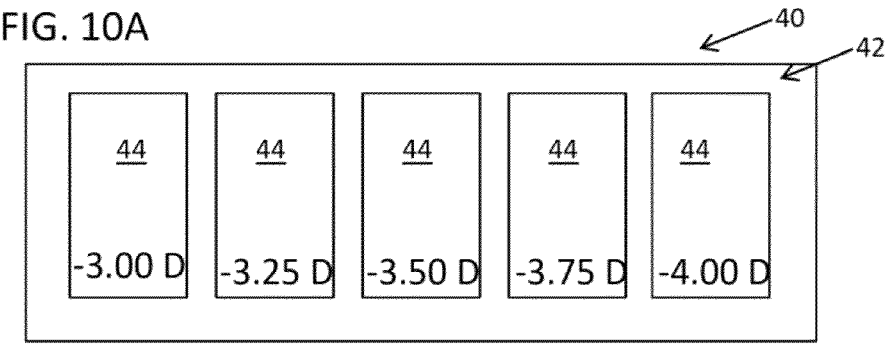
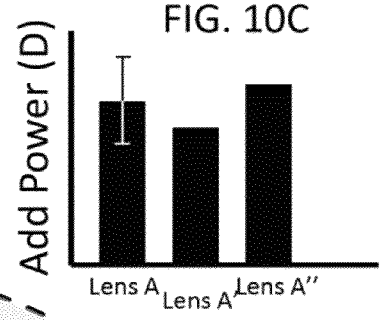
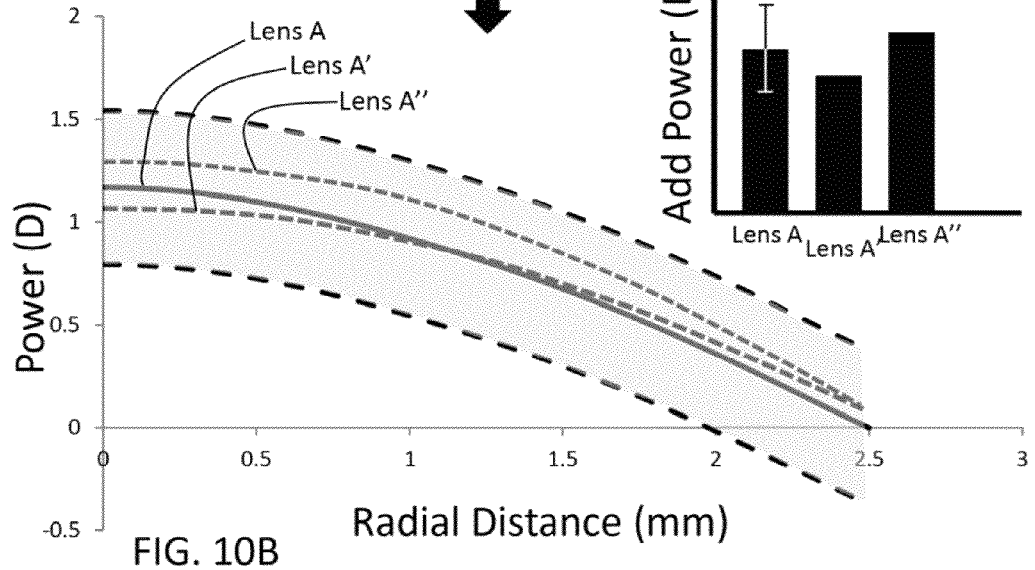
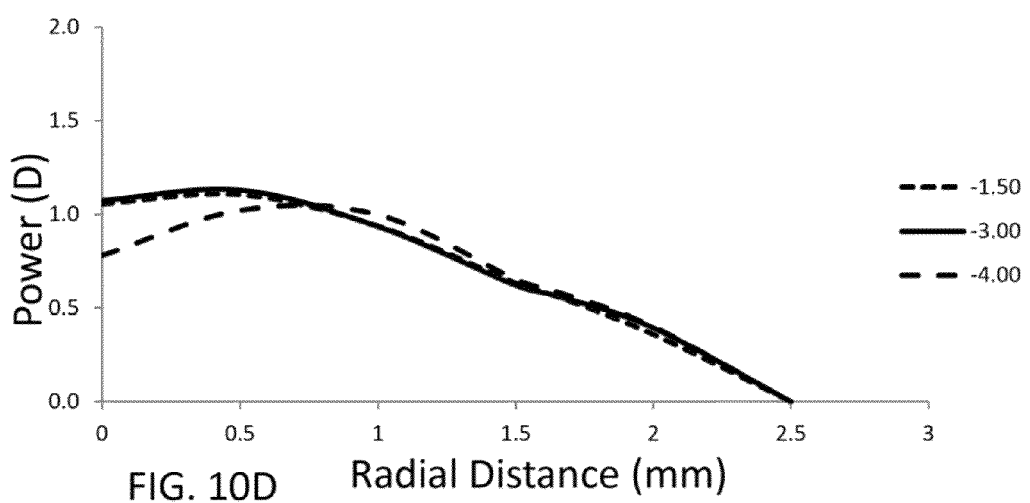

|  | Dominant Eye | Non-dominant eye |
|---|---|---|
| Low ADD (up to +1.00 D) | Lens A    132A | Lens A    134A |
| Med Add (+1.25 D – +1.75 D) | Lens A    132B | Lens A (overcorrected by +0.25 - +1.25 D; e.g., +0.75 D)    134B |
| High Add (+2.00 D - +2.50 D) | Lens A    132C | Lens C (overcorrected by +0.25 D - +1.25 D; e.g., +0.75 D or +1.00 D)    134C |

FIG. 13

MULTIFOCAL CONTACT LENSES AND RELATED METHODS AND USES TO IMPROVE VISION OF PRESBYOPIC SUBJECTS

This application claims the benefit under 35 U.S.C. §119 (e) of prior U.S. Provisional Patent Application No. 61/594,842, filed Feb. 3, 2012, which is incorporated in its entirety by reference herein.

FIELD

The present disclosure is directed to multifocal contact lenses and methods of making and using multifocal contact lenses, as well as batches and sets of multifocal contact lenses.

BACKGROUND

Contact lenses have been described as being useful in correcting presbyopia. Some methods and devices for treating presbyopia or improving vision of presbyopic subjects have been described, such as in EP0201231A1, EP2183639A1, GB2086605A, U.S. Pat. Nos. 5,220,359, 5,715,031, 5,754,270, 5,771,088, 5,835,192, 6,322,213, 6,520,638, 6,540,353, 7,517,084, 7,625,086, 7,753,521, US20090051870A1, US20100321632A1, US2011310347A1, WO0008516, and WO0135880.

As one example, in a monovision correction system, a presbyopic person wears one contact lens having a design for only correcting distance vision in one eye (e.g., the lens has a single labeled sphere power to correct distance vision), and a second contact lens having a design for only correcting near vision in the other eye (e.g., the lens has a single labeled sphere power to correct near vision). Monovision correction seems to provide better results for presbyopic subjects requiring low Add power correction (e.g., low Add patients). Higher Add subjects tend to experience more visual discomfort or visual compromise with monovision systems, such as blurred images and the like.

As another example, multifocal contact lenses having aspheric optics to provide a relatively smooth transition in optical power across the lens, or multifocal contact lenses with distinct optical zones that alternate between distance and near refractive powers have also been described as being useful for correcting presbyopia. Examples of contact lenses for correcting presbyopia include: the ACUVUE OASYS for Presbyopia (Vistakon, Jacksonville, Fla., USA; lens pairs consisting of two center-distance lenses); the PUREVISION MULTIFOCAL (Bausch & Lomb, Rochester, N.Y., USA; lens pairs consisting of two center-near front surface aspheric lenses); the AIR OPTIX AQUA MULTIFOCAL (Ciba Vision, Duluth, Ga., USA; lens pairs consisting of two center-near aspheric lenses); and FREQUENCY 55 MULTIFOCALS, PROCLEAR MULTIFOCALS, and BIOFINITY MULTIFOCALS (each from CooperVision, Pleasanton, Calif., USA; lens pairs consisting of a center-distance lens and a center-near lens).

Although multifocal contact lenses provide vision improvement to many presbyopic subjects, multifocal contact lenses can produce secondary images or "ghost" images, as perceived by the subject. This ghosting is likely to be attributed to defined zones and/or narrow transitions between distance and near powers of the multifocal contact lenses. It remains a challenge to provide both clear distance visual acuity and clear near visual acuity to the subject, let alone do so and reduce or avoid visual discomfort or visual compromise, such as ghosting, contrast loss, and the like. This challenge is especially true for subjects requiring medium or high Add powers in contact lenses (such as subjects requiring an Add power correction greater than +1.00 diopter).

To address this challenge and meet the requirements of eye care practitioners (ECPs) and presbyopic subjects, contact lens manufacturers currently offer multiple lens choices for an ECP to select from and prescribe. Although the relatively large number of options available to the ECP and subject or patient appears beneficial, the large number of options can reduce the efficiency of the ECP by requiring more time to find the desired lens combination for a particular subject from among the large number of options. Providing large number of lens combinations to ECPs is also undesirable for a contact lens manufacturer, or distributor, or both because the increased number of lens designs and combinations for different sphere powers and Add powers result in increased inventory that must be made and stored to provide to the ECP or the subject.

Based on the increasing number of presbyopic people, there continues to be a need for new multifocal contact lenses which provide effective vision correction to presbyopic people.

SUMMARY

The present invention addresses a need in the art to provide multifocal contact lenses that provide a desired amount of distance visual acuity and near visual acuity, without significantly compromising the distance visual acuity and without unduly introducing additional visual compromise, especially for presbyopic subjects requiring more than +1.00 diopters of Add power (e.g., medium Add and high Add presbyopic subjects). As used herein, a presbyopic subject is understood to be a person who is presbyopic, and the phrase "presbyopic subject" is used interchangeably with presbyope. If the presbyopic subject is a patient of an eye care practitioner (ECP), that presbyopic subject may be referred to herein as a presbyopic patient. At the same time, the present invention addresses a need to simplify the fitting process of multifocal contact lenses for ECPs and to simplify the manufacture of the multifocal contact lenses by contact lens manufacturers.

The present invention is based on the discovery that multifocal contact lenses that utilize an aspheric power profile in the optic zone within a certain range or within certain parameters, as discussed herein, can provide binocular visual acuity that is better than that attained with existing multifocal contact lenses without introducing additional visual compromise, such as ghosting, contrast loss, and the like, even though monocular visual acuity at near and far viewing distances in either eye (e.g., only one eye) is less than the binocular visual acuity at near and far viewing distances.

As discussed herein, with the present lenses and present methods, a presbyopic subject, such as a medium Add or high Add presbyope, is monocularly optimally or best corrected for distance vision in the dominant eye of the subject, monocularly over-corrected for distance vision in the non-dominant eye of the subject, and is binocularly under-corrected for Add power (i.e., under-correcting the Add power in both lenses). As one non-limiting example, provided for purposes of illustration only, a myopic presbyope may require a prescription of −3.00 diopters (D) to correct distance vision in each eye (i.e., the non-dominant eye and the dominant eye), and may require an Add power of +1.75 D to correct the lack of accommodation associated with presbyopia. In accordance with the present disclosure, the presbyope would be prescribed a multifocal contact lens, as described herein, for the dominant eye that has a distance vision refractive power of −3.00 D and an Add power that is less than +1.75 D (such as, a lens having an Add power that is a value from +0.75 D to +1.50 D), and would be prescribed a lens for the non-dominant eye that has a distance vision refractive power that is more positive than −3.00 D (such as, a lens labeled as having a distance vision refractive power that is a value from −2.75 D to −1.75 D) and an Add power that is less than +1.75 D (such as, a lens labeled as having an Add power that is a value from +0.75 D to +1.50 D). For example, the Add power in such lenses could be +0.75 D, +1.00 D, +1.25 D, or +1.50 D. A higher Add presbyope requiring an Add power of greater than +2.00 D may be prescribed lenses having an Add power of about +1.75 D or 2.00 D, as a further example. As used herein, a distance vision refractive power refers to the optical power of the contact lens that is effective in correcting distance vision of a presbyope; the phrase distance vision refractive power is used interchangeably with the term distance power, as used in the art. In addition, the word "a" or "an", as used herein, means one or more, and is synonymous with "at least one". A plurality refers to two or more, and is synonymous with "multiple". The term including, as used herein, is an open-ended term which is intended to have the same meaning as comprising.

With the present multifocal contact lenses, methods, and uses, it is possible for a presbyope to utilize the visual processing of the brain to compensate for the reduced monocular visual acuity and provide a perceived superior binocular visual acuity compared to the monocular visual acuity provided by either lens alone. As described herein, this can be achieved by providing an aspheric multifocal contact lens for the dominant eye of a presbyope, and by providing a similar aspheric multifocal contact lens for the non-dominant eye of the presbyope, but the lens for the non-dominant eye has a distance vision refractive power that is more positive than the presbyope's distance vision refraction necessary to provide a visual acuity of 20/30 or 20/20 or better. For example, by providing a multifocal contact lens of the multifocal contact lenses described herein for the presbyope's non-dominant eye that has a distance vision refractive power that is +0.25 to +1.25 diopters more positive than the presbyope's distance vision requirement, the presbyope's binocular visual acuity improves compared to his monocular visual acuity due to binocular summation. That is, the monocular refractive blur caused by the over-corrected lens on the non-dominant eye has little impact on binocular visual acuity, and the presbyope perceives distant images as determined by combined images from the lenses in the dominant eye and non-dominant eye, which is of better image quality than the individual images from either eye. The degraded image of the non-dominant eye resulting from the over-correction of the distance vision of the non-dominant eye, can actually add to and improve the contrast of the image from the dominant eye.

As described in more detail herein, the present multifocal contact lenses each have an aspheric power profile in the optic zone that attempts to reduce or minimize the change in power across the optic zone, and particularly, the central 5 mm diameter portion of the optic zone and still provide a binocularly acceptable distance vision and near vision visual acuity. The aspheric power profile is designed to provide an effective Add power while also providing a rate of change that is not too steep so as to maintain sufficient near vision correction across the central portion of the optic zone and to reduce visual disturbances, such as ghost images, flares, and the like. The improved clinical results observed with the present multifocal contact lenses and methods and uses are related to monocularly balancing contrast loss and over-correction (i.e., in only one eye), but by under-correcting the Add power binocularly (i.e., in both eyes of a subject). This combination helps reduce contrast loss binocularly. As can be appreciated from the present description, a new system and methods for improving vision of presbyopic subjects or presbyopes are described, and which provide simplicity for a contact lens manufacturer by reducing inventory requirements, provide simplicity for an ECP by reducing the number of effective options for the ECP to choose and fit to a presbyope, and thereby reduce the chair time of the presbyope to achieve a successful improvement in vision, and provide sufficient binocular distance visual acuity and near visual acuity without introducing additional visual compromise. These improvements are related to the shape of the aspheric power profile, the reduced variability in power profiles across lenses of different distance vision refractive powers, an effective amount of monocular over-correction of the distance vision refractive power for a non-dominant eye, and an effective amount of binocular under-correction of the Add power of the presbyope.

In one aspect, the present invention relates to multifocal contact lenses (e.g., two or more multifocal contact lenses). Furthermore, in this aspect, the present invention relates to methods of using the multifocal contact lenses, such as methods of supplying multifocal contact lenses to eye care practitioners (ECPs), methods of supplying multifocal contact lenses to presbyopic subjects, methods of fitting presbyopic subjects with multifocal contact lenses, and methods of improving vision or visual acuity of presbyopic subjects with the present multifocal contact lenses. In this context, the multifocal contact lenses and methods can be understood to relate to perspectives of ECPs, contact lens manufacturers, contact lens distributors, contact lens retailers, or presbyopic subjects, or combinations thereof.

In accordance with the foregoing aspect, the multifocal contact lenses include a first multifocal contact lens for the dominant eye of the presbyopic subject, and a second multifocal contact lens for the non-dominant eye of the presbyopic subject. Each of the first multifocal contact lens and the second multifocal contact lens includes an optic zone. The optic zone is circumscribed by a peripheral zone. The optic zone has an optic zone center and an optic zone perimeter spaced radially away from the optic zone center and defining a boundary between the optic zone and the peripheral zone. The optic zone has an aspheric power profile extending from the optic zone center towards the optic zone perimeter and provides a near vision refractive power and a distance vision refractive power, or distance power as used in the art, such that each of the multifocal contact lenses has an Add power. The Add power is the absolute difference in power between the near vision refractive power and the distance vision refractive power (thus, as used herein, the Add power is always a positive number). In accordance with this aspect of the present invention, the first multifocal contact lens has a distance vision refractive power effective in providing the presbyopic patient with a high contrast visual acuity of 20/30 (Snellen notation) or better for the dominant eye at a viewing distance of at least 6 meters. In terms of diopters (D), the distance vision refractive power can be from +20.00 D to −20.00 D, and the appropriate distance vision refractive power is selected to provide the presbyopic subject with the desired distance visual acuity. The second multifocal contact lens has a near vision refractive power effective in providing the presbyopic subject with a high contrast visual acuity of 20/30 (Snellen notation) or better for the non-dominant eye at a viewing distance of about 60 centimeters or less. The second multifocal contact lens also has a distance vision refractive power that is offset by about +0.25 diopters to about +1.25 diopters relative to the distance power correction for the non-dominant eye of the presbyopic subject. In accordance with this aspect and the present teachings, the binocular visual acuity provided to the presbyopic subject by the pair of the first and second multifocal contact lenses worn simultaneously is greater than the monocular visual acuity provided to the presbyopic subject by either the first multifocal contact lens or the second multifocal contact lens, alone.

Additional features in accordance with the foregoing aspect will be appreciated from the following detailed description, drawings, examples, and claims.

In a second aspect, the present invention relates to a batch or batches of multifocal contact lenses, and methods of manufacturing a batch or batches of multifocal contact lenses. In this context, the batch or batches of multifocal contact lenses and the present methods can be understood to relate to the perspective of a contact lens manufacturer.

In accordance with this second aspect, a batch of multifocal contact lenses for improving vision of presbyopic subjects is provided. The batch includes, consists essentially of, or consists of, a plurality of multifocal contact lenses (e.g., two or more), which can be provided in packages. Each of the multifocal contact lenses includes an optic zone, and a peripheral zone, as described above. The optic zone has an optic zone center and an optic zone perimeter spaced radially away from the optic zone center and defining a boundary between the optic zone and the peripheral zone. The optic zone has an aspheric power profile extending from the optic zone center towards the optic zone perimeter and providing a near vision refractive power and a distance vision refractive power such that each of the multifocal contact lenses has an Add power, wherein the Add power is the absolute difference in power between the near vision refractive power and the distance vision refractive power, as described herein. The plurality of multifocal contact lenses includes a plurality of first multifocal contact lens groups. Each first multifocal contact lens group includes multifocal contact lenses providing a unique single distance vision refractive power for the first multifocal contact lens group (e.g., one group has a distance vision refractive power of −2.00 D, and a second group has a distance vision refractive power of −3.00 D, etc.). The aspheric power profile of each of said multifocal contact lenses within a single contact lens group provides a single Add power selected from a value from about 0.75 diopters to 2.00 diopters over a radial distance of 2.5 mm from the optic zone center for each lens of the series. For example, each multifocal contact lens of a single contact lens group may have a single Add power of 0.75 D, 1.00 D, 1.25 D, 1.50 D, 1.75 D, or 2.00 D as measured along a 2.5 mm radius from the optic zone center. The Add power provided by the aspheric power profile of the individual multifocal contact lenses of any of the first multifocal contact lens groups varies by no more than ±0.25 D compared to the Add power provided by a relative aspheric power profile of the plurality of multifocal contact lenses. As used herein, the relative aspheric power profile is the average of power profiles of the plurality of multifocal contact lenses and in which the distance vision refractive power at a radial distance of 2.5 mm is fixed at 0.00 diopters. Thus, the aspheric power profile is normalized such that the optical power of the lens at a radial distance of 2.5 mm is 0.00 D. The Add power of individual multifocal contact lenses of the group can vary by plus or minus (±) 0.25 D from the relative aspheric power profile. Thus, if the relative aspheric power profile has an Add power of 1.10 D, individual multifocal contact lenses may have Add powers from 0.85 D to 1.35 D. The aspheric power profile of the individual multifocal contact lenses of any of the first multifocal contact lens groups also have similar shapes. In particular, the aspheric power profiles differ by no more than ±0.375 D compared to the relative aspheric power profile of the plurality of multifocal contact lenses along the power profile for each radial distance measured along the power profile. Thus, along the radial distance of 2.5 mm, the individual power profiles do not vary by more than 0.375 D in either direction (positive or negative). In the methods of manufacturing the batch or batches of multifocal contact lenses, the methods include a step of forming the plurality of multifocal contact lenses from a polymerizable composition (e.g., lens formulation). The contact lenses may be lathed contact lenses, in which the aspheric power profile is lathed directly on to the polymer, may be static cast molded contact lenses, where the aspheric power profile is machined on to a metal insert that is used to form contact lens molds, or may be spun cast contact lenses, in which the aspheric power profile is machined onto a metal insert used to shape a single mold surface on which a polymerizable composition is placed to cure.

Additional features in accordance with the second aspect will be appreciated from the following detailed description, drawings, examples, and claims.

In a third aspect, the present invention relates to a set or sets of multifocal contact lenses for improving vision of presbyopic subjects. As one example, a set of this aspect may be understood to be a fitting set of the present multifocal contact lenses. As described further, a set of multifocal contact lenses includes a dominant eye series and a non-dominant eye series (e.g., multifocal contact lenses for placement on either the dominant eye or non-dominant eye of the subject, respectively). The dominant eye series and non-dominant eye series can be presented as two distinct series of lenses, each with their own distance refractive powers. Or, the dominant eye series and the non-dominant eye series can be presented as a single set of lenses, where an ECP selects a first multifocal contact lens from the set for placement on the subject's dominant eye, and the ECP selects a second multifocal contact lens from the set for placement on the subject's non-dominant eye. In accordance with this third aspect, methods of providing multifocal contact lenses are also disclosed. In this context, the set or sets of multifocal contact lenses and the present methods can be understood to relate to the perspective of a contact lens manufacturer, an ECP, a contact lens distributor, or a contact lens retailer.

In accordance with this third aspect, a set of multifocal contact lenses for improving vision of presbyopic subjects is provided. A set, as described herein, includes, consists essentially of, or consists of, (i) a dominant eye series of multifocal contact lenses and (ii) a non-dominant eye series of multifocal contact lenses. Each of the multifocal contact lenses in each series includes an optic zone that has an optic zone center and an optic zone perimeter. The optic zone perimeter is spaced radially away from the optic zone center and defines a boundary between the optic zone and a peripheral zone. The optic zone has an aspheric power profile extending from the optic zone center towards the optic zone perimeter and provides a near vision refractive power and a distance vision refractive power such that each of said multifocal contact lenses has an Add power. As described herein, the Add power is the absolute difference in power between the near vision refractive power and the distance vision refractive power. The dominant eye series includes a plurality of dominant eye patient lens sets correlating to Add power requirements of presbyopic subjects or patients (e.g., two or more patient lens sets, which can be labeled as being useful for medium Add and high Add subjects, low Add and medium Add subjects, low Add and high Add subjects, or low Add subjects, medium Add subjects, and high Add subjects). The plurality of patient lens sets includes a first dominant eye patient lens set that includes multifocal contact lens groups. The groups include multifocal contact lenses providing unique distance vision refractive powers, as described herein. Each group includes at least one multifocal contact lens (i.e., one or more multifocal contact lenses). The aspheric power profile of each of the multifocal contact lenses of the dominant eye patient lens set provides a single Add power selected from a value from about 0.75 diopters to 2.00 diopters over a radial distance of 2.5 mm from the optic zone center for each lens of the series. The Add power provided by the aspheric power profile of individual multifocal contact lenses of the first dominant eye patient lens set varies by no more than ±0.25 diopters compared to the Add power provided by a relative aspheric power profile of the multifocal contact lenses of the first dominant eye patient lens set. As described herein, the relative aspheric power profile is the average of power profiles of a plurality of multifocal contact lenses of the first dominant eye patient lens set and in which the distance vision refractive power at a radial distance is fixed at 0.00 diopters.

The non-dominant eye series of the foregoing set or sets also includes a plurality of patient lens sets correlating to Add power requirements of presbyopic subjects or patients. The plurality of patient lens sets includes a first non-dominant eye patient lens set including multifocal contact lenses, wherein each of the multifocal contact lenses of the first non-dominant eye patient lens set having an aspheric power profile that provides a single Add power selected from a value from about 0.75 diopters to 2.00 diopters over a radial distance of 2.5 mm from the optic zone center for each lens of the first non-dominant eye patient lens set, so long as the distance vision refractive power provided by the aspheric power profile of the multifocal contact lenses of the first non-dominant eye patient lens set is offset by about +0.25 diopters to about +1.25 diopters relative to the distance power correction for a presbyopic subject.

A method in accordance with this third aspect includes a step of manufacturing the plurality of multifocal contact lenses to have an aspheric power profile in the optic zone, as described herein. The manufactured multifocal contact lenses are packaged in contact lens packages. The packaged multifocal contact lenses, as described herein, are provided to a contact lens distributor, a contact lens retailer, or an ECP, or combinations thereof. The packaged multifocal contact lenses so provided include a dominant eye series and a non-dominant eye series, as described above.

Additional features in accordance with the third aspect will be appreciated from the following detailed description, drawings, examples, and claims.

In a fourth aspect, the present invention provides methods of using the present multifocal contact lenses. For example, a method of prescribing multifocal contact lenses to a presbyopic subject are described. In this context, such methods can be understood to relate to the perspective of an ECP or other individual or entity that prescribes contact lenses to people.

In accordance with this fourth aspect, a method of prescribing multifocal contact lenses to a presbyopic subject includes a step of fitting the presbyopic subject with a pair of multifocal contact lenses. The presbyopic subject so fit requires an Add power correction of at least 1.25 D (e.g., from 1.25 D to 3.00 D). A first multifocal contact lens of the pair includes a first aspheric power profile derived from a first nominal aspheric power profile. A second multifocal contact lens of the pair includes a second aspheric power profile derived from the first nominal aspheric power profile, but the second aspheric power profile provides or has a distance vision refractive power offset by about +0.25 D to about +1.25 D relative to the distance power correction for the non-dominant eye of the presbyopic subject. With such a fitting, monocular distance visual acuity is different for each eye with each contact lens, and binocular summation is still maintained when the first and second contact lenses are worn simultaneously. The method may optionally include fitting a second pair of multifocal contact lenses where the first multifocal contact lens of the second pair has the same aspheric power profile as the first aspheric power profile of the first multifocal contact lens, and the second contact lens of the second pair has an aspheric power profile that provides an area under the curve (AUC) that is between 5% and 45% greater than the AUC of the aspheric power profile of the first multifocal contact lens of the second pair. The methods may also include a step of conducting an eye examination to determine ocular dominance. The methods may also include a step of determining a prescription of the presbyopic subject and prescribing the first and second multifocal contact lenses to the presbyopic subject.

Additional features in accordance with the fourth aspect will be appreciated from the following detailed description, drawings, examples, and claims.

Additional aspects and embodiments of the present lenses, batches, sets, methods, and uses will be apparent from the following description, drawings, examples, and claims. As can be appreciated from the foregoing and following description, each and every feature described herein, and each and every combination of two or more of such features, is included within the scope of the present invention provided that the features included in such a combination are not mutually inconsistent. In addition, any feature or combination of features may be specifically excluded from any embodiment of the present invention.

BRIEF DESCRIPTION OF THE DRAWINGS

FIG. 1A is an illustration of a first multifocal contact lens. FIG. 1B is an illustration of a second multifocal contact lens. FIG. 1C illustrates an aspheric power profile from the center of the optic zone of the lens (0 mm) to about the optic zone perimeter (radial distance of about 4.1 mm) of the contact lens of FIG. 1A. FIG. 1D illustrates an aspheric power profile from the center of the optic zone of the lens (0 mm) to about the optic zone perimeter (radial distance of about 4.1 mm) of the contact lens of FIG. 1B. FIG. 1E is a magnified view of FIG. 1C illustrating the aspheric power profile for a radial distance of 2.5 mm FIG. 1F is a magnified view of FIG. 1D illustrating the aspheric power profile for a radial distance of 2.5 mm.

FIG. 7 is a table of different visual acuity scales, as understood by persons or ordinary skill in the art.

FIG. 8 is an illustration of a set of multifocal contact lenses in accordance with the present invention.

FIGS. 10A-10D illustrate a batch of multifocal contact lenses in accordance with the present invention. FIG. 10A illustrates a batch that includes multiple groups of multifocal contact lenses, each group corresponding to a unique distance refractive power. FIG. 10B illustrates aspheric power profiles for three multifocal contact lenses in accordance with the present invention. The shaded region depicts the amount of variability of the power profile along the radial distance that individual lenses may have, and still be understood to be within the teachings of the present invention. FIG. 10C illustrates the Add power for the three lenses of FIG. 10B. The Add power can vary by plus/minus 0.25 diopters (D). FIG. 10D illustrates aspheric power profiles of three of the present multifocal contact lenses, each having a unique distance vision refractive power (i.e., −1.50 D, −3.00 D, and −4.00 D).

FIG. 13 is an illustration of a set of multifocal contact lenses similar to FIG. 8.

DETAILED DESCRIPTION

Figure 1A:
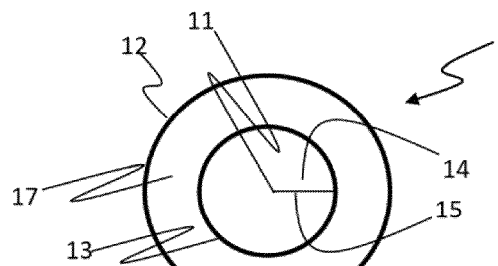
FIGS. 1A-1F illustrate multifocal contact lenses in accordance with the present invention.

As described herein, the present invention is based on the discovery that multifocal contact lenses that include an optic zone that has an aspheric power profile to provide an Add power correction can be used and made to provide presbyopic subjects with a desired amount of distance visual acuity and a desired amount of near visual acuity without unduly compromising or negatively affecting the distance visual acuity, and without unduly introducing additional visual compromise, especially for presbyopes requiring more than +1.00 diopters (D) of Add power correction (e.g., medium Add and high Add presbyopes). With the present multifocal contact lenses and the present methods, a presbyopic subject, such as a medium Add or high Add presbyope, is monocularly optimally or best corrected for distance vision in the dominant eye of the subject, and monocularly over-corrected for distance vision in the non-dominant eye of the subject, and is binocularly under-corrected for Add power relative to the Add power correction needed by the presbyope (e.g., without including the over-correction of the non-dominant eye). In accordance with the present teachings, the present multifocal contact lenses improve near vision without unduly disturbing distance vision, and without unduly introducing additional ghosting compared to currently existing bifocal and multifocal contact lens products. With the present multifocal contact lenses, a balance of distance vision and near vision between both eyes provides improved multifocal vision to presbyopes. Unlike monovision systems, which create cortical summation loss, the multifocal contact lenses of the present invention maintain binocular cortical summation. As used herein, binocular cortical summation or binocular summation refers to an increase in the binocular response compared with the monocular respone, when the sensitivities of the dominant eye and non-dominant eye are equal, as described by Pardhan et al., Optometry and Vision Science (1990), Vol. 67, No. 9, pp. 688-691, *Binocular inhibition: psychophysical and electrophysiological evidence*; and Pardhan et al., Ophthal. Physiol. Opt., (1990), Vol. 10, January, 33-36, *The effect of monocular defocus on binocular contrast sensitivity*. Unlike existing bifocal and multifocal systems, which tend to cause more visual compromise, such as ghosting, contrast loss, and the like, for medium Add and high Add presbyopes, the multifocal contact lenses of the present invention not only provide clear distance visual acuity and clear near visual acuity, but do so without introducing additional vision compromise.

Multifocal contact lenses are described herein. The present multifocal contact lenses are useful in improving or correcting vision of a presbyopic subject. As understood by persons of ordinary skill in the art, the presbyopic subject has a dominant eye and a non-dominant eye. Ocular dominance can be determined by an eye care practitioner (ECP) using conventional methods, such as the "lens fogging" technique, the Miles test, the Porta test, the Dolman method, the Pinhole test, and the like. Presbyopia typically begins to manifest in people forty years of age or older. Presbyopes are frequently grouped into low Add groups (requiring up to 1.00 diopter (D) of Add power correction); medium Add groups (requiring from 1.25 D to 1.75 D of Add power correction); or high Add groups (requiring from 2.00 D or more of Add power correction). Frequently, high Add presbyopes require an Add power correction less than 3.00 D.

The multifocal contact lenses described herein include a first multifocal contact lens and a second multifocal contact lens. As used herein, the first multifocal contact lens is for the dominant eye of the presbyope, and the second multifocal contact lens is for the non-dominant eye of the presbyope. That is, each contact lens will be placed on the respective eye of the presbyopic subject.

Each of the first multifocal contact lens and the second multifocal contact lens includes an optic zone. The optic zone of each has an optic zone center and an optic zone perimeter. The optic zone perimeter is spaced radially away or apart from the optic zone center. The optic zone perimeter defines a boundary or border between the optic zone and a peripheral zone of the contact lens. The optic zone, as defined by the optic zone perimeter, can be visualized using conventional lens inspection devices and techniques, such as interferometers, and the like.

The optic zone of each multifocal contact lens has an aspheric power profile. The aspheric power profile extends from the optic zone center towards the optic zone perimeter. With the aspheric power profile, a near vision refractive power and a distance vision refractive power is provided, and accordingly, the multifocal contact lenses each have an Add power. The present multifocal contact lenses can be center-distance aspheres or center-near aspheres. A center-distance asphere is a multifocal contact lens in which the distance vision refractive power, or distance power, is located in the center of the lens. A center-near asphere is a multifocal contact lens in which the near vision refractive power, or near power, is located in the center of the lens. The distance power corresponds to the portion of the power profile that is relatively more negative, and the near power corresponds to the portion of the profile that is relatively more positive. For purposes of simplicity, the following description will be based on multifocal contact lenses that are center-near aspheres. It is to be understood that the present multifocal contact lenses and methods are not limited to multifocal contact lenses that are center-near aspheres, unless specifically stated.

As used herein, the Add power is the absolute difference in power between the near vision refractive power and the distance vision refractive power. The near power zone of the aspheric power profile corresponds to a region of the profile (or the optic zone) where the optical power is the most positive. In the context of the present disclosure, including the illustrated embodiments of multifocal contact lenses, the near power zone refers to a central zone of the optic zone having a 2 mm diameter (1 mm radial distance from the optic zone center). The distance power zone of the aspheric power profile corresponds to a region of the profile (or the optic zone) where the optical power is the most negative. In the context of the present disclosure, including the illustrated embodiments, the distance power zone refers to a zone circumscribing the central zone and beginning at 1.25 mm from the optic zone center and extending to 2.25 mm from the optic zone center. The near power of the near power zone refers to the average power of the near power zone. The distance power of the distance power zone refers to the average power of the distance power zone. Thus, the Add power of the present multifocal contact lenses can be understood to be the absolute difference between the average distance power and the average near power. The Add power of the present multifocal contact lenses, including multifocal contact lenses of the present batches and sets disclosed herein, can be at least 0.50 D. In the embodiments described further herein, the Add power of the multifocal contact lenses is from about 0.75 D to no greater than 2.00 D. For example, the Add power may be about 0.75 D, about 1.00 D, about 1.25 D, about 1.50 D, about 1.75 D, or 2.00 D. Preferably, the Add power of the present multifocal contact lenses has a value between 0.75 D and 2.00 D.

The first multifocal contact lens of the multifocal contact lenses has a distance vision refractive power effective in providing the presbyopic subject with a high contrast visual acuity of 20/30 (Snellen notation) or better for the dominant eye at a viewing distance of at least 6 meters. In other words, the first multifocal contact lens is optimally or best corrected for distance vision for the dominant eye of the presbyopic subject and provides clear high contrast visual acuity at far viewing distances (i.e, 6 meters or more). Visual acuity is measured using conventional techniques, as understood by persons of ordinary skill in the art. For example, the visual acuity can be determined using a Snellen eye chart or a log MAR chart during the course of an eye examination. FIG. 7 illustrates visual acuity scales, such as the Snellen notation in feet, meters, or decimal notation, as well as the corresponding log MAR values. The distance vision refractive power refers to a refractive power required for achieving the presbyopic subject's subjective best distance correction for the dominant eye.

The second multifocal contact lens has a near vision refractive power effective in providing the presbyopic subject with a high contrast visual acuity of 20/30 (Snellen notation) or better for the non-dominant eye at a viewing distance of about 60 centimeters or less, such as about 40 cm, for example. In other words, the second multifocal contact lens provides clear or acceptable high contrast visual acuity to the presbyopic subject at near viewing distances (e.g., 60 cm or less). The near vision refractive power is the amount of optical power necessary to correct the subject's near visual acuity. In addition, the second multifocal contact lens has a distance vision refractive power that is offset by about +0.25 D to about +1.25 D relative to the distance power correction for the non-dominant eye of the presbyopic subject. The distance vision refractive power of the second multifocal contact lens in accordance with the present invention can be offset by +0.25 D, +0.50 D, +0.75 D, +1.00 D, or +1.25 D, relative to the distance power correction of the non-dominant eye. In certain embodiments, including the illustrated embodiments, the offset of the distance vision refractive power of the second multifocal contact lens is +0.75 D or +1.00 D.

The combination of the first and second multifocal contact lenses described hereinabove provide binocular visual acuity to the presbyopic subject that is greater than the monocular visual acuity provided to the presbyopic subject by either the first multifocal contact lens or the second multifocal contact lens, alone. As described herein, with respect to the results of the Examples, with the present multifocal contact lenses, lens pairs (i.e., first and second multifocal contact lenses) can be provided to presbyopic subjects to improve their vision by maintaining binocular cortical summation for any age of subject (e.g., 40 years to 70 years, etc.).

Figure 1B:
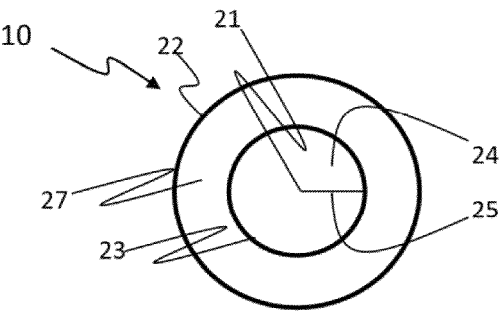

An example of the present multifocal contact lenses 10 is illustrated in FIGS. 1A-1F. A first multifocal contact lens 12 is illustrated in FIG. 1A, and a second multifocal contact lens 22 is illustrated in FIG. 1B. The first multifocal contact lens 12 includes an optic zone 14 and a peripheral zone 17, which circumscribes the optic zone 14. The optic zone 14 has an optic zone center 11 and an optic zone perimeter 13 spaced radially away from the optic zone center 11. A radius 15 is illustrated as extending from the optic zone center 11 to the optic zone perimeter 13. The second multifocal contact lens 22 includes an optic zone 24 and a peripheral zone 27, which circumscribes the optic zone 24. The optic zone 24 has an optic zone center 21 and an optic zone perimeter 23 spaced radially away from the optic zone center 21. A radius 25 is illustrated as extending from the optic zone center 21 to the optic zone perimeter 23.

Figure 1C:
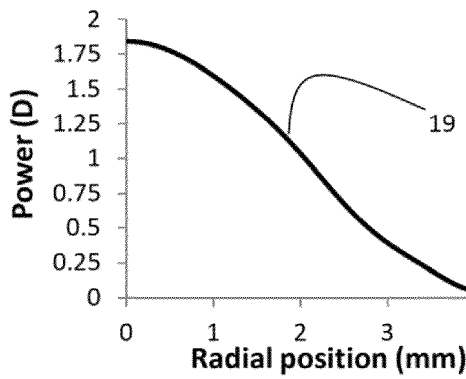
Figure 1D:
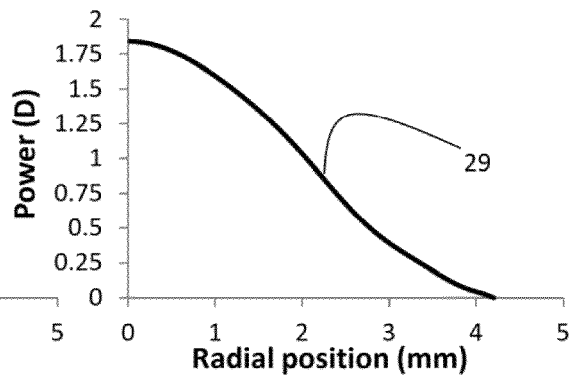
Figure 1E:
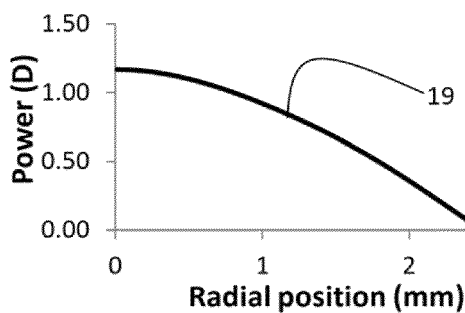
Figure 1F:
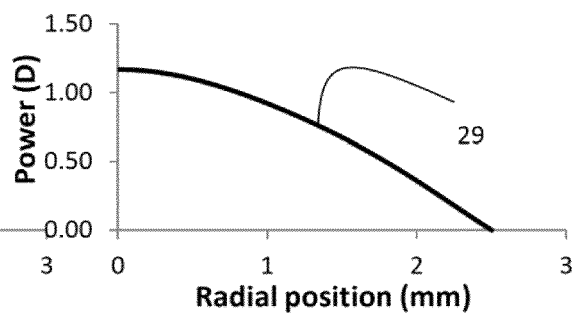

In embodiments of the present multifocal contact lenses, the optic zone has a diameter from about 7.00 mm to about 9.00 mm, and thus, the radius, such as radius 15 or radius 25, may be from 3.5 mm to 4.5 mm from the optic zone center. As shown in FIGS. 1C and 1D, the aspheric power profiles 19 and 29 of the multifocal contact lenses 12 and 22, respectively, are illustrated over a radius of about 4.1 mm, such that the optic zone diameter of each multifocal contact lens is about 8.2 mm. FIG. 1E is a magnified illustration of FIG. 1C depicting the aspheric power profile over a radial distance of 2.5 mm. FIG. 1F is a magnified illustration of FIG. 1D depicting the aspheric power profile over a radial distance of 2.5 mm. As discussed herein, the emphasis of the present disclosure is on the 2.5 mm radius of the optic zone and aspheric power profile since many presbyopes have pupils with diameters that dilate to approximately 5.0 mm. Therefore, the central 5.0 mm diameter of the optic zone is significant in influencing acceptance of the vision correction provided by the multifocal contact lenses.

As shown in FIGS. 1C-1F, the aspheric power profiles are relatively more positive towards the center of the lens (i.e., the center of the lens has a more positive optical power than the periphery), and thus, the multifocal contact lenses 12 and 22 can be understood to be near-center aspheres. In other words, the optical power of the lens is more negative in the periphery of the optic zone relative to the center of the optic zone. In addition, the aspheric power profiles 19 and 29 have been normalized such that the distance vision refractive power is set to 0 D. This has been done for purposes of illustration, only. In practice, a multifocal contact lens of the present invention, and having a distance power of −3.00 D would actually have an aspheric power profile with the power at a 2.5 mm radial distance being about −3.00 D.

Thus, it can be understood that the aspheric power profiles illustrated herein are provided for purposes of illustration only to complement the teachings of the present application. In addition, the illustrated aspheric power profiles may be understood to correspond to nominal or target power profiles used in the design of the present multifocal contact lenses, or may be understood to be representative of a relative aspheric power profile, as defined herein. Actual power profiles for multifocal contact lenses as measured using optical instruments may vary from the illustrated profiles, similar to those power profiles shown in FIG. 10D. Further, since the aspheric power profiles illustrated herein are normalized to 0.0 D at a radial distance of 2.5 mm, these profiles do not account for the true optical power of each lens (e.g., the actual distance power for the different lenses, such as −3.00, −2.00, −1.50 D, etc.), or the over-correction of the non-dominant eye lenses.

The aspheric power profile of multifocal contact lenses can be measured or determined using conventional equipment and methods, such as by using interferometers, wavefront sensors, and the like, as understood by persons of ordinary skill in the art. Some examples of suitable wavefront sensors include those provided by Optocraft (Erlangen, Germany) or Rotlex (Omer, Israel), or a Shack-Hartmann wavefront sensor (Clear-Wave, Abott Medical Optics-Wavefront Sciences, Albuquerque, N. Mex., USA). In addition, the aspheric power profile of the present multifocal contact lenses can be described or characterized by any suitable mathematical function or equation, as understood by persons of ordinary skill in the art. For example, the aspheric power profile of the multifocal contact lenses of the present invention may be represented by an even order polynomial, a Zernike polynomial, and the like.

With the present multifocal contact lenses, the aspheric power profile of the first multifocal contact lens and the aspheric power profile of the second multifocal contact lens provide a difference in high contrast visual acuity between the first multifocal contact lens and the second multifocal contact lens that is at least one line of a Snellen visual acuity chart or a log MAR visual acuity chart at a viewing distance of at least 6 meters.

With the present multifocal contact lenses, the aspheric power profile of the first multifocal contact lens and the aspheric power profile of the second multifocal contact lens provide a difference in high contrast visual acuity between the first multifocal contact lens and the second multifocal contact lens that is less than half a line of a Snellen visual acuity chart or a log MAR visual acuity chart at a viewing distance from about 60 centimeters to about 1.5 meters (i.e., intermediate distances).

With the present multifocal contact lenses, the aspheric power profile of the first multifocal contact lens and the aspheric power profile of the second multifocal contact lens provide a difference in high contrast visual acuity between the first multifocal contact lens and the second multifocal contact lens that is at least one line of a Snellen visual acuity chart or a log MAR visual acuity chart at a viewing distance no greater than 60 centimeters (i.e., near viewing distances).

As mentioned herein, any of the preceding multifocal contact lenses can include a first multifocal contact lens and a second multifocal contact lens that have distance vision refractive powers effective in providing different monocular distance visual acuity for each eye with each contact lens, and binocular summation is still maintained when the lenses are simultaneously worn.

In addition to providing an Add power correction, embodiments of the present multifocals may include a cylinder correction to correct a subject's astigmatism. Thus, either the first multifocal contact lens, or the second multifocal contact lens, or both may include a toric optic zone having a cylinder power effective in correcting astigmatism of the presbyopic subject. Some non-limiting examples of cylinder powers that are useful in the present toric multifocal contact lenses include −0.75 D, −1.25 D, −1.75 D, −2.25 D, and −2.75 D, as well as cylinder powers having values between any of these listed powers. Thus, the present toric multifocal contact lenses can have a cylinder power having a value from −0.75 D to −2.75 D. As discussed herein, if the toric multifocal contact lenses are provided in a series of lenses, the series can have cylinder powers from −0.75 D to −2.75 D, or any subset thereof, such as −0.75 D to −2.25 D, −1.00 D to −2.25 D, and the like.

The present multifocal contact lenses can be either hard contact lenses or soft contact lenses. Preferably, the multifocal contact lenses are soft contact lenses. As used herein, a soft contact lens is a contact lens that can be folded upon itself without breaking. The present multifocal contact lenses can be hydrogel contact lenses. As used herein, a hydrogel contact lens refers to a hydrated contact lens that has an equilibrium water content (EWC) of at least 10%. Frequently, the EWC is between 20% and 90%, and preferably, the EWC of the present multifocal contact lenses is between 30% and 70%. The present contact lenses can also be silicone hydrogel contact lenses. As used herein, a silicone hydrogel contact lens is a hydrogel contact lens that includes a silicon or silicone component. Examples of some of the hydrogel or silicone hydrogel lens formulations useful for the present multifocal contact lenses have United States Adopted Names (USANs) of: etafilcon A, nelfilcon A, hilafilcon A, methafilcon A, ocufilcon A, ocufilcon B, ocufilcon C, ocufilcon D, omafilcon A, balafilcon A, lotrafilcon A, lotrafilcon B, galyfilcon A, senofilcon A, narafilcon A, narafilcon B, comfilcon A, etafilcon A, or stenfilcon A.

Figure 2A:
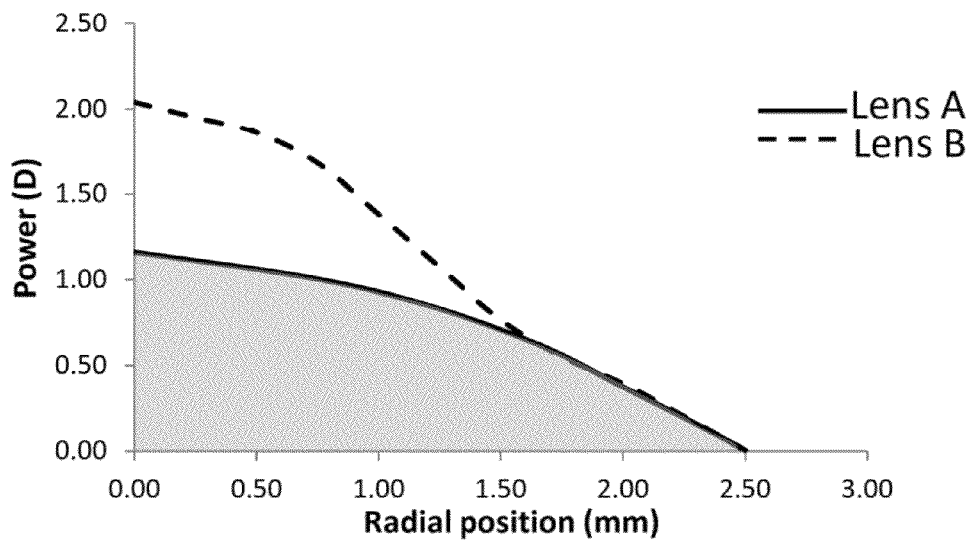
FIG. 2A illustrates an aspheric power profile of a Lens A in accordance with the present invention, and an aspheric power profile of a Lens B as a comparative. The shaded portion depicts the area under the curve (AUC) of the aspheric power profile of Lens A.
Figure 2B:
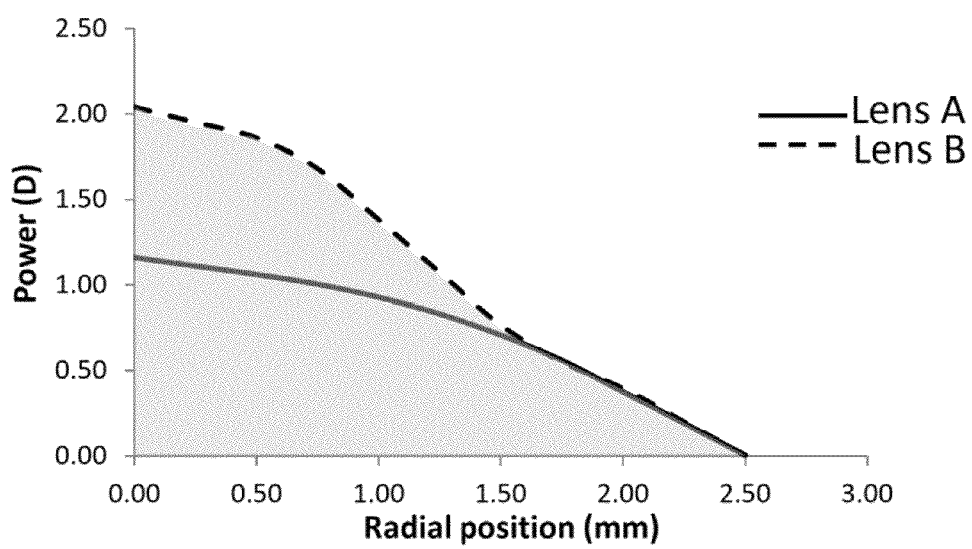
FIG. 2B illustrates an aspheric power profile of a Lens A in accordance with the present invention, and an aspheric power profile of a Lens B as a comparative. The shaded portion depicts the area under the curve (AUC) of the aspheric power profile of Lens B.

FIG. 2A and FIG. 2B illustrated aspheric power profiles for two different multifocal contact lenses, Lens A and Lens B. Lens A is represented by an aspheric power profile providing an Add power between 1.00 D and 1.25 D. Lens B is represented by an aspheric power profile providing an Add power of about 2.00 D. The shaded region of FIG. 2A corresponds to the area under the curve (AUC) of Lens A. The shaded region of FIG. 2B corresponds to the AUC of Lens B. The AUC of Lens B is about 47% greater than the AUC of Lens A. This can be attributed to the increased Add power and the greater rate of change in diopters/mm (e.g., analogous to slope) observed for the Lens B power profile. In accordance with the present disclosure, the present multifocal contact lenses have power profiles that provide AUCs similar to Lens A or less than 147% of the AUC of Lens A (e.g., less than the AUC of the power profile of Lens B). The AUC of any power profile can be calculated using any conventional technique, such as the Trapezoid Rule, Simpson's ⅓ Rule, or Integration of a Regression Equation. In the present application, the Trapezoid Rule was used to calculate the AUC. In brief, the curves are divided into a series of trapezoids, each trapezoid having an area. The AUC corresponds to the sum of the areas of the trapezoids. An example of the equation used to calculate the AUC can be described as: AUC=(sum of two adjacent Y values)/2)×(the difference of two adjacent X values), where Y corresponds to diopters and X corresponds to millimeters, as shown in the Figures.

Figure 3:
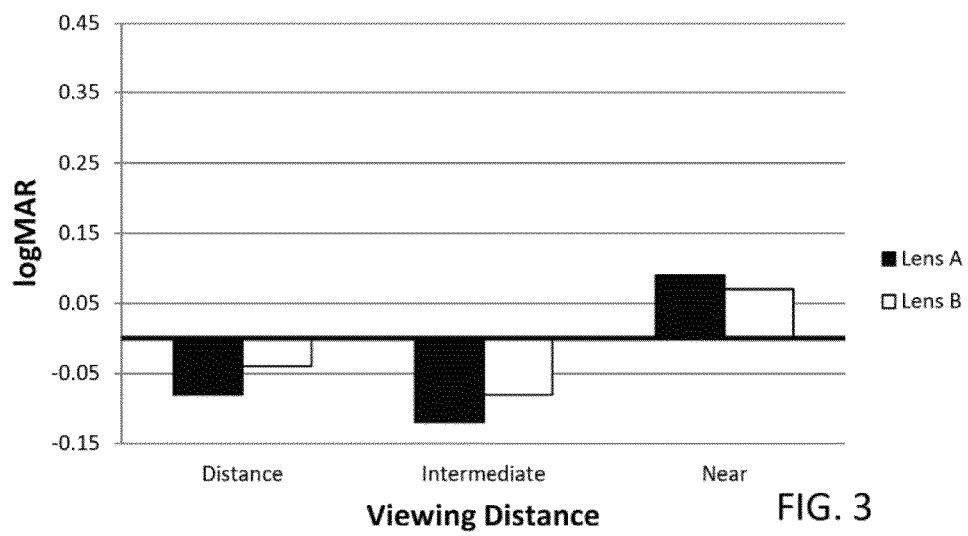
FIG. 3 is a graph illustrating log MAR values as a measure of visual acuity of medium Add subjects under high illumination and high contrast conditions for Lens A and Lens B of FIGS. 2A and 2B.
Figure 4:
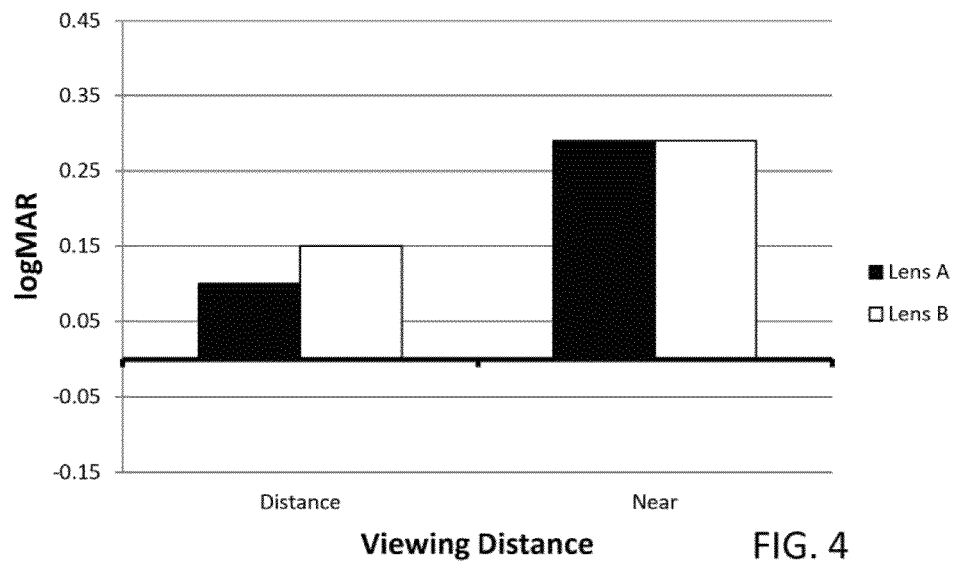
FIG. 4 is a graph illustrating log MAR values as a measure of visual acuity of medium Add subjects under low illumination and low contrast conditions for Lens A and Lens B of FIGS. 2A and 2B.

As described below, including the Examples, distance visual acuity is significantly improved for presbyopes wearing a pair of Lens A multifocal contact lenses, in accordance with the present disclosure, as compared to the same presbyopes wearing a pair of Lens B multifocal contact lenses. Intermediate visual acuity is improved for Lens A wearers under high illumination, high contrast conditions, compared to Lens B wearers. In addition, despite the binocular undercorrection of Add power, the near vision provided by pairs of Lens A lenses to Lens A wearers is substantially the same as the near vision provided by pairs of Lens B lenses to Lens B wearers. This is observed for both medium Add and high Add presbyopic subjects. For example, FIG. 3 illustrates log Mar values for medium Add presbyopes wearing a pair of Lens A lenses, in accordance with the present invention, or Lens B lenses, as a comparative, under high illumination and high contrast conditions. As understood by persons of ordinary skill in the art, a relatively more negative log MAR value is indicative of better or clearer visual acuity. Thus, values less than 0 log MAR, which corresponds to 20/20 in Snellen notation, indicate better visual acuity than values greater than 0 log MAR. As shown in FIG. 3, Lens A wearers have improved distance and intermediate visual acuity, and comparable near visual acuity, compared to the same wearers wearing pairs of Lens B lenses. As shown in FIG. 4, distance visual acuity is better for Lens A wearers than Lens B wearers under low illumination and low contrast, and near vision was equal.

Figure 5:
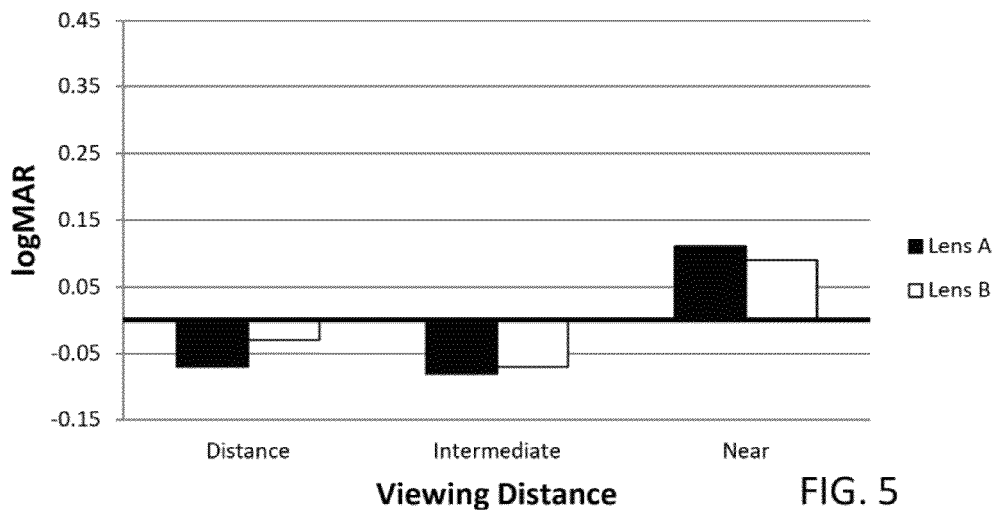
FIG. 5 is a graph illustrating log MAR values as a measure of visual acuity of high Add subjects under high illumination and high contrast conditions for Lens A and Lens B of FIGS. 2A and 2B.
Figure 6:
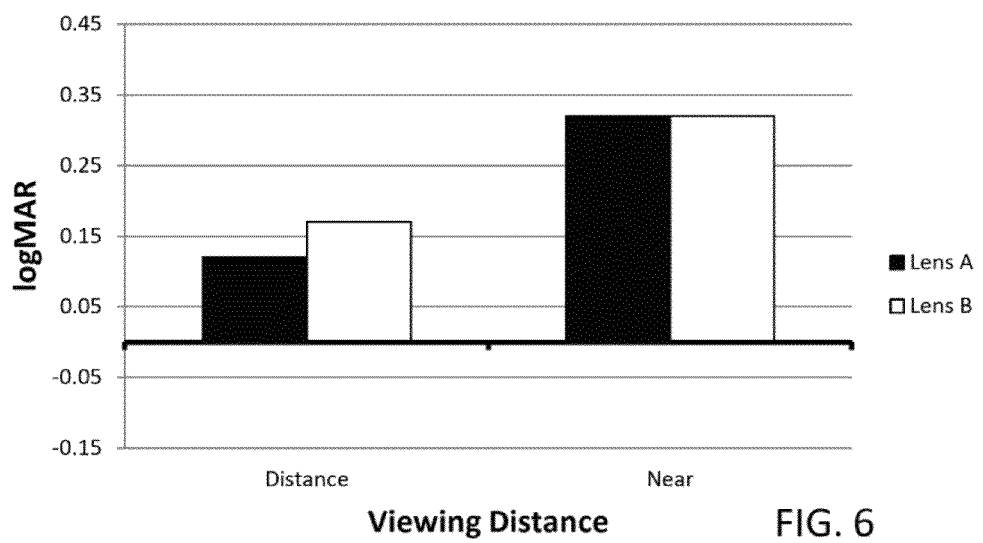
FIG. 6 is a graph illustrating log MAR values as a measure of visual acuity of high Add subjects under low illumination and low contrast conditions for Lens A and Lens B of FIGS. 2A and 2B.

FIG. 5 is similar to FIG. 3 but for high Add presbyopes. As shown in FIG. 5, high Add Lens A wearers have improved distance visual acuity under high illumination and high contrast, with comparable intermediate and near visual acuities. FIG. 6 is similar to FIG. 4 but for high Add presbyopes. As shown in FIG. 6, high Add Lens A wearers have improved distance visual acuity and equal near visual acuity under low illumination and low contrast.

With respect to FIGS. 3-6, high and low illumination refer to the relative lighting within the area of the visual acuity assessment, and high contrast and low contrast refer to the relative contrast of letters being read compared to the background of the letters, as understood by persons of ordinary skill in the art.

Thus, as shown in FIGS. 3-6, the multifocal contact lenses of the present invention provide substantial improvements in visual acuity (e.g., good distance vision and near vision, without compromising distance vision) in medium Add and high Add presbyopes compared to multifocal contact lenses that have relatively higher Add powers (e.g., about 2.00 D or more) and that have aspheric power profiles with AUCs that are at least about 47% greater than the AUC of the aspheric power profile of the multifocal contact lenses of the present invention.

The multifocal contact lenses of the present invention can be manufactured in a variety of ways. For example, the contact lenses can be lathed from polymer rods or buttons, where a lathe is used to machine the aspheric power profile onto a surface of the polymer rod or button. Or, the contact lenses can be spun cast, where a single female mold is formed, such as by injection molding, and which has a concave surface having the aspheric power profile for the present contact lenses. Or, the contact lenses can be static cast molded, which involves polymerizing a lens formulation or polymerizable composition between a male and female mold member. In a preferred method, the contact lenses are static cast molded, as described herein in reference to FIG. 9.

Figure 9:
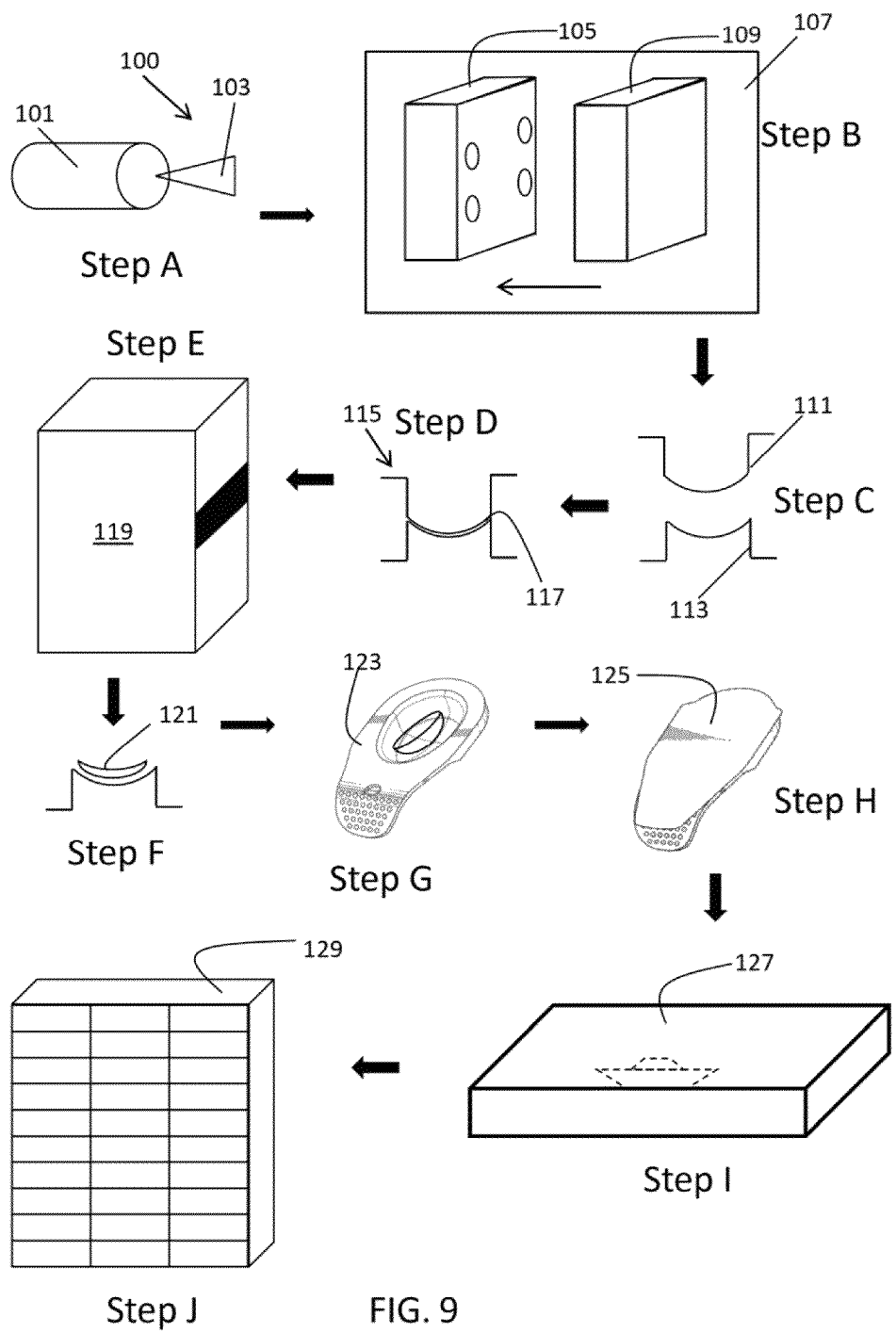
FIG. 9 is an illustration of a manufacturing method useful in the manufacture of the multifocal contact lenses, batches thereof, groups thereof, and sets thereof, in accordance with the present invention.

FIG. 9 illustrates a static cast molding manufacturing method 100. The method begins by forming optical inserts at step A. This forming involves lathing an optical surface onto a surface of a metallic insert (represented as 101 in FIG. 9) with a tip of a lathe 103. Lathed optical inserts are then placed in a plate 105 of an injection molding machine 107. A second plate 109 is moved into contact with plate 105 to form contact lens mold cavities near the optical insert at Step B. Mold forming material, such as polystyrene, polypropylene, or vinyl alcohol mold forming materials, are injection molded into the contact lens mold cavities, to produce a male mold member 111 and a female mold member 113. At step C, a volume of polymerizable composition can be dispensed on the concave surface of the female mold member 113. At step D, the male and female mold members are placed in contact with each other to form a contact lens mold assembly 115 having a contact lens shaped cavity 117 containing the polymerizable composition. At step E, contact lens mold assemblies are placed in a curing system 119 that allows the polymerizable composition to polymerize. Polymerization is usually carried out using heat, ultraviolet light, or a combination thereof. The contact lens mold assemblies are removed from the curing system 119 and the male and female mold members are demolded, or separated from each other. The polymerized contact lens product remains attached to either the male mold member of the female mold member. In FIG. 9, the polymerized contact lens product 121 remains attached to the concave surface of the female mold member. The polymerized contact lens product is delensed, or separated, from the female mold member at Step F. The delensing can be done using a liquid, or it can be done mechanically without use of a liquid. The delensed contact lens product is placed in a cavity of a primary contact lens package 123 at Step G. In FIG. 9, the primary contact lens package is a blister pack. At step H, the blister pack is sealed and sterilized by autoclaving and the like. The sterilized blister packs 125 are placed in secondary packaging 127 at Step I, which in FIG. 9 is illustrated as a carton. The secondary packaging can then be placed in a cabinet device 129 at Step J, such as for a fitting set of lenses, as described herein, or can be packaged in tertiary packaging for shipment or storage.

In accordance with the present invention, a method of supplying multifocal contact lenses for a presbyopic subject to an ECP is provided. As described herein, the presbyopic subject has a dominant eye, and a non-dominant eye, which can be determined by an ECP. The present method includes a step of manufacturing the multifocal contact lenses of the present invention, as described herein. The method further includes a step of providing the multifocal contact lenses to an eye care practitioner for fitting the presbyopic subject with the first multifocal contact lens and the second multifocal contact lens. As described herein, the first multifocal contact lens provided to the ECP has a distance vision refractive power effective in providing the presbyopic subject with a high contrast visual acuity of 20/30 or better at a viewing distance of at least 6 meters, and the second multifocal contact lens has a near vision refractive power effective in providing the presbyopic subject with a high contrast visual acuity of 20/30 or better at a viewing distance of about 60 centimeters or less, and has a distance vision refractive power that is offset by about +0.25 D to about +1.25 D relative to the distance power correction for the non-dominant eye of the presbyopic subject. The binocular visual acuity provided to the presbyopic subject by the pair of the first and second multifocal contact lenses worn simultaneously is greater than or improved relative to the monocular visual acuity provided to the presbyopic subject by either the first multifocal contact lens or the second multifocal contact lens, alone. Thus, the binocular visual acuity is better than either of the monocular visual acuities at distant and near viewing distances.

In another method, a method of supplying multifocal contact lenses to a presbyopic subject is provided. Such a method includes a step of receiving an order for the multifocal contact lenses, as described herein, such as the first and second multifocal contact lenses described above, or as illustrated in FIGS. 1A-1F. After receiving the order, the method includes a step of providing the multifocal contact lenses to the presbyopic subject. As described herein, the first multifocal contact lens provided to the ECP has a distance vision refractive power effective in providing the presbyopic subject with a high contrast visual acuity of 20/30 or better at a viewing distance of at least 6 meters, and the second multifocal contact lens has a near vision refractive power effective in providing the presbyopic subject with a high contrast visual acuity of 20/30 or better at a viewing distance of about 60 centimeters or less, and has a distance vision refractive power that is offset by about +0.25 D to about +1.25 D relative to the distance power correction for the non-dominant eye of the presbyopic subject. The binocular visual acuity provided to the presbyopic subject by the pair of the first and second multifocal contact lenses worn simultaneously is greater than or improved relative to the monocular visual acuity provided to the presbyopic patient by either the first multifocal contact lens or the second multifocal contact lens, alone. In some methods, the receiving step optionally includes a step of receiving a prescription of the presbyopic subject for the first and second multifocal contact lenses.

Another method of using the present multifocal contact lenses relates to fitting a presbyopic subject with the multifocal contact lenses. A method of fitting a presbyopic subject includes a step of selecting a first multifocal contact lens for the dominant eye of the presbyopic subject, and a step of selecting a second multifocal contact lens for the non-dominant eye of the presbyopic subject. Each of the first and second multifocal contact lenses are as described above, and the first multifocal contact lens has a distance vision refractive power effective in providing the presbyopic subject with a high contrast visual acuity of 20/30 or better for the dominant eye at a viewing distance of at least 6 meters, and the second multifocal contact lens has a near vision refractive power effective in providing the presbyopic subject with a high contrast visual acuity of 20/30 or better for the non-dominant eye at a viewing distance of about 60 centimeters or less, and has a distance vision refractive power that is offset by about +0.25 diopters to about +1.25 diopters relative to the distance power correction for the non-dominant eye of the presbyopic subject. The binocular visual acuity provided to the presbyopic subject by the pair of multifocal contact lenses worn simultaneously is greater than the monocular visual acuity provided by either multifocal contact lens, alone. The method may also include a step of determining which eye of the presbyopic subject is the dominant eye. The method may also include a step of prescribing the first and second multifocal contact lenses to the presbyopic subject.

Another method of using the multifocal contact lenses of the present invention relates to improving vision of a presbyopic subject. A method of improving vision of a presbyopic subject includes a step of providing any of the multifocal contact lenses of the present invention to the presbyopic subject. The contact lenses are provided for self administration by the subject to his or her own eyes. In some regions, the method may include the proviso that the step of administration by the subject is not part of the present methods of the invention.

In the foregoing methods, the first and second multifocal contact lenses have distance vision refractive powers effective in providing different monocular distance visual acuity for each eye with each contact lens (e.g., the dominant eye is fully corrected for distance vision, and the non-dominant eye is over-corrected for distance vision), and binocular summation is still maintained.

Any of the multifocal contact lenses of the present invention may be used in the methods described herein, and in certain embodiments, the first and second multifocal contact lenses are near-center aspheric multifocal contact lenses; in certain embodiments, one or both of the first and second multifocal contact lenses includes a toric optic zone effective in correcting astigmatism of the presbyopic subject; and in certain embodiments, the multifocal contact lenses are hydrogel or silicone hydrogel contact lenses.

Another aspect of the present invention relates to batches of multifocal contact lenses, as discussed herein. In the manufacture of the present multifocal contact lenses on a commercial scale, it is desired to produce multiple contact lenses in parallel and accumulating the contact lenses so produced in batches. Typically, the contact lenses are also accumulated in groups of single distance powers, such that they can be packaged in secondary packaging containing one or more lenses of the same distance power. As can be appreciated, due to manufacturing tolerances and instrument variability in measuring power profiles, the aspheric power profiles of the present multifocal contact lenses may appear slightly different than the nominal or target power profile used to design the lenses. Unlike some existing multifocal contact lenses, which show dramatic differences in Add powers across groups of multifocal lenses with different distance powers, or show differences in power profile shapes across groups of multifocal contact lenses with different distance powers, the present batches are produced such that multifocal contact lenses within a group are substantially similar to each other. For example, the Add power of the multifocal contact lenses can vary by plus or minus (±) 0.25 D, and the aspheric power profile can vary by ±0.375 D along the radial distance of the power profile. Thus, multiple groups of multifocal contact lenses can be produced in accordance with the present invention based on a single nominal or target aspheric power profile used in the design of the multifocal contact lenses.

Accordingly, a batch of multifocal contact lenses of the present invention includes a plurality of multifocal contact lenses. Each of the multifocal contact lenses includes an optic zone having an optic zone center and an optic zone perimeter spaced radially away from the optic zone center. The optic zone perimeter defines a boundary between the optic zone and a peripheral zone of the contact lens. The optic zone has an aspheric power profile extending from the optic zone center towards the optic zone perimeter and provides a near vision refractive power and a distance vision refractive power such that each of said multifocal contact lenses has an Add power. As described herein, the Add power is the absolute difference in power between the near vision refractive power and the distance vision refractive power.

The plurality of multifocal contact lenses of the batch include a plurality of first multifocal contact lens groups. For example, the plurality of multifocal contact lenses can be divided into multifocal contact lens groups. As one example, if a plurality of contact lenses is 1,000 contact lenses, the plurality can include 10 groups of 100 contact lenses. Each of the first multifocal contact lens groups includes multifocal contact lenses that have a unique single distance vision refractive power corresponding to the distance power label for the first multifocal contact lens group. As one example, the first multifocal contact lens groups can include one group of multifocal contact lenses have a distance power of −3.00 D, one group of multifocal contact lenses having a distance power of −3.25 D, one group of multifocal contact lenses having a distance power of −3.50 D, one group of multifocal contact lenses having a distance power of −3.75 D, one group of multifocal contact lenses having a distance power of −4.00 D, and so on. The first multifocal contact lens groups can have multifocal contact lenses having distance powers from +20.00 D to −20.00 D in 0.25 D increments (in other words, the groups can have multifocal contact lenses having a single distance power from +20.00 D to −20.00 D, or any value therebetween).

As described above, within the first multifocal contact lens groups, the aspheric power profile of each of the multifocal contact lenses within a single group, e.g., having a single distance power, is substantially similar to each other. For example, the total amount of Add power provided by the aspheric power profile is substantially similar, and the shape of the aspheric power profile is substantially similar. The similarity derives from the use of a single nominal or target aspheric power profile in the design of the multifocal contact lenses of individual groups.

More specifically, the aspheric power profile of each of the multifocal contact lenses within a single contact lens group provides an Add power selected from a value from about 0.75 D to 2.00 D over a radial distance of 2.5 mm from the optic zone center for each lens of the group. The Add power may be 0.75 D, 1.00 D, 1.25 D, 1.50 D, or 1.75 D, for example. The Add power for any individual multifocal contact lenses varies by no more than ±0.25 D compared to the Add power provided by a relative aspheric power profile of the plurality of multifocal contact lenses. As used herein, the relative aspheric power profile refers to the average of power profiles of the plurality of multifocal contact lenses within the single group, and in which the distance vision refractive power at a radial distance of 2.5 mm is fixed at 0.00 D.

In addition, the aspheric power profiles have similar shapes. More specifically, the aspheric power profile of the individual multifocal contact lenses of any of the first multifocal contact lens groups differs by no more than ±0.375 D compared to the relative aspheric power profile of the plurality of multifocal contact lenses within a single group along the power profile for each distance measured. For example, if the optical power of the lens is measured along a radius of 2.5 mm in 0.05 mm increments, the optic power at any of those 0.05 mm increments is within 0.375 D from the optic power of the relative aspheric power profile at the same position.

As an illustration of the batches of multifocal contact lenses of the present invention, reference is made to FIGS. 10A to 10D. FIG. 10A illustrates a batch 40 of multifocal contact lenses. The batch 40 includes a plurality 42 of multifocal contact lenses. The plurality 42 of multifocal contact lenses includes a plurality of first multifocal contact lens groups 44. Each multifocal contact lens group 44 has multifocal contact lenses providing a unique single distance vision refractive power. These unique single powers are represented in FIG. 10A as −3.00 D, −3.25 D, −3.50 D, −3.75 D, and −4.00 D, by way of example and not limitation. Accordingly, in the first multifocal contact lens group 44 labeled with a −3.00 D distance vision refractive power, the multifocal contact lens or lenses within that group each of a distance power of about −3.00 D.

FIG. 10B illustrates the similarity of power profiles for the multifocal contact lenses within a single group. The power profile labeled as Lens A is similar to the power profile illustrated in FIGS. 1E and 1F. However, in FIG. 10B, the Lens A power profile represents the relative aspheric power profile described above. In other words, it is the average of the power profiles for the individual multifocal contact lenses within the group, and the distance power at a radial distance of 2.5 mm is 0.00 D. The shaded region represents the spread of ±0.375 D from the relative aspheric power profile. Two other multifocal power profiles are illustrated by the lines labeled Lens A' and Lens A". Each of these aspheric power profiles are within the 0.375 D tolerance from the relative aspheric power profile, as described above, and therefore, are examples of multifocal contact lenses of the present batches.

FIG. 10C illustrates the Add power of the relative aspheric power profile (Lens A), and the two multifocal contact lenses (Lens A' and Lens A"). The error bars for the Lens A Add power reflect the tolerance of ±0.25 D of the Add power of the relative aspheric power profile. Both the Lens A' and Lens A" have Add powers within the 0.25 D tolerance.

FIG. 10D illustrates an example of aspheric power profiles of the multifocal contact lenses of the batches of the present invention but for three different groups. One trace is for a group with multifocal contact lenses that have a distance power of −1.50 D, one trace is for a group with multifocal contact lenses that have a distance power of −3.00 D, and one trace is for a group with multifocal contact lenses that have a distance power of −4.00 D. As can be appreciated from FIG. 10D, even across different lens groups (e.g., different distance powers), the aspheric power profiles of embodiments of multifocal contact lenses of the present invention are substantially similar.

In accordance with the present disclosure, in some embodiments of the present batches of the invention, a batch includes a plurality of multifocal contact lenses that also includes a plurality of second multifocal contact lens groups. Briefly, the multifocal contact lenses of the second multifocal contact lens groups have aspheric power profiles that are different than the aspheric power profiles of the multifocal contact lenses of the first multifocal contact lens groups. In more detail, the second multifocal contact lens groups include multifocal contact lenses that provide a unique single distance vision refractive power, as described above for the first groups. Each of the multifocal contact lenses of the second multifocal contact lens groups have an aspheric power profile that provides an AUC that is between 5% to 45% greater than an AUC of the relative aspheric power profile of the multifocal contact lenses of the first multifocal contact lens groups.

Figure 11A:
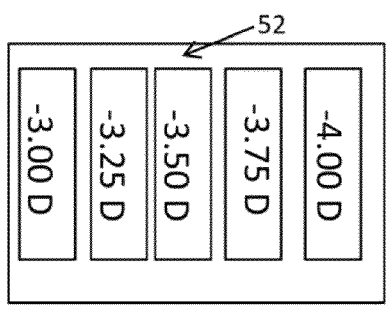
FIG. 11A illustrates a second group of multifocal contact lenses, useful with the batch illustrated in FIG. 10A.

An example of such second contact lens groups is illustrated in FIG. 11A at reference number 52. The second contact lens groups 52 is similar to the first contact lens groups 42 except that the multifocal contact lenses of the second contact lens group 52 have a different power profile than those of the first contact lens group 42. As described herein, multifocal contact lenses having a power profile similar to the Lens B power profile illustrated in FIG. 11B do not perform as well for visual acuity compared to the multifocal contact lenses of the present invention, such as multifocal contact lenses having a power profile similar to that represented as Lens A in FIG. 11B. In accordance with this second multifocal contact lens group, the multifocal contact lenses can have an aspheric power profile as referenced by Lens C in FIG. 11B. The power profile of Lens C provides an AUC (shaded region) that is between 5% and 45% greater than the AUC provided by the power profile for Lens A. Lenses of the second multifocal contact lens group with such power profiles are useful in further improving the vision of presbyopes requiring 2.00 D or more of Add power correction.

In some embodiments, the AUC of the multifocal contact lens groups is less than 35% greater than the AUC of the relative aspheric power profile of the multifocal contact lenses of the first multifocal contact lens groups.

As discussed herein, not only is the amount of Add power important with the present teachings, but the rate of change in optic power over the radius of 2.5 mm is important. It is believed that the greater the rate of change (e.g., a steeper slope), the greater visual discomfort is provided to the presbyopic subject since the transition from near power to distance power is greater over a shorter distance. For example, visually, it is apparent that the slope of the power profile of Lens B of FIG. 11B at about 0.75 mm to about 1.5 mm is steeper than the corresponding slope for the Lens A power profile.

Figure 11B:
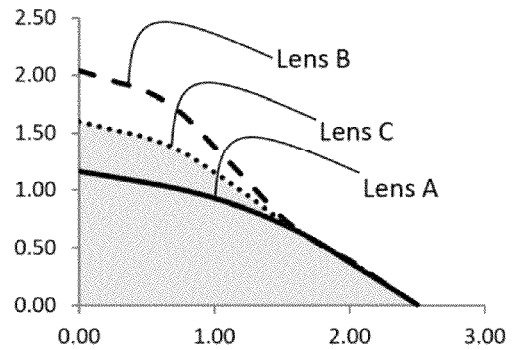
FIG. 11B illustrates an aspheric power profile for a multifocal contact lens (Lens C) of the second group of FIG. 11A, which has an AUC greater than Lens A, and less than Lens B.
Figure 12:
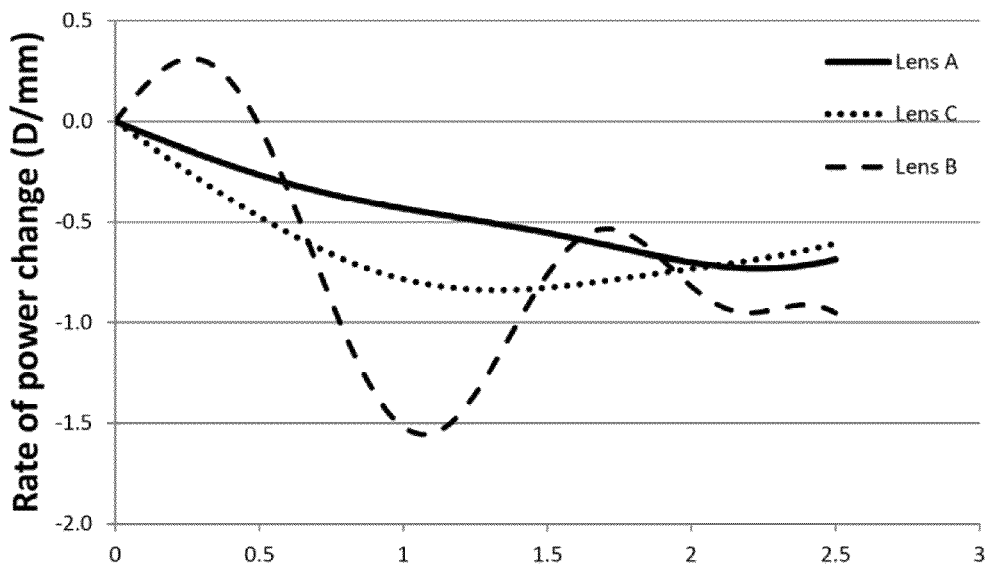
FIG. 12 is an illustration of the rate of power change over a radial distance of 2.5 mm, for Lens A, Lens B, and Lens C of FIG. 11B.

FIG. 12 illustrates the rate of power change (D/mm) as a function of radial position for the Lens A, Lens B, and Lens C power profiles of FIG. 11B. The rate of power change is determined by calculating the first order derivative of each of the power profiles. FIG. 12 illustrates that the absolute value of maximum rate of power change for Lens A is about 0.7 to 0.8 D/mm, for Lens C is about 0.9 D/mm, and for Lens B is about 1.5 D/mm.

Thus, in accordance with the present teachings, in any of the batches of the present invention, some embodiments provide individual multifocal contact lenses that have aspheric power profiles with a maximum rate of power change having an absolute value greater than 0.0 D/mm and less than 0.9 D/mm.

As discussed herein, the mutifocal contact lenses of the batches of the present invention can be provided as lens pairs that are effective to provide an improved visual acuity to a presbyopic subject compared to the visual acuity provided to the presbyopic subject by either multifocal contact lens of the pair, alone. In addition, in certain embodiments of the batches of the present invention, the multifocal contact lenses are near-center aspheric multifocal contact lenses. The multifocal contact lenses can include a toric optic zone having a cylinder power that is effective in correcting astigmatism of the presbyopic subject (e.g., have any cylinder power from about −0.75 D to about −2.75 D). The multifocal contact lenses of the batches can be hydrogel or silicone hydrogel contact lenses, as described herein.

The present invention also provides methods of manufacturing batches of multifocal contact lenses.

A method of manufacturing a batch of multifocal contact lenses includes a step of forming a plurality of multifocal contact lenses from a polymerizable composition. As discussed herein, the lenses can be formed by forming polymer buttons and lathing an aspheric power profile onto a surface of the polymer button. Or, the lenses can be static cast molded from molds that have an aspheric power profile provided by a contact lens mold that is formed using a metallic insert with an aspheric power profiled machined thereon. As discussed herein, each of the multifocal contact lenses includes an optic zone having an optic zone center and an optic zone perimeter spaced radially away from the optic zone center. The optic zone perimeter defines a boundary between the optic zone and a peripheral zone. The optic zone has an aspheric power profile extending from the optic zone center towards the optic zone perimeter and providing a near vision refractive power and a distance vision refractive power such that each of said multifocal contact lenses has an Add power, wherein the Add power is the absolute difference in power between the near vision refractive power and the distance vision refractive power.

As described in the context of the batches of the present invention, and repeated here for clarity, the plurality of multifocal contact lenses includes a plurality of first multifocal contact lens groups. Each first multifocal contact lens group includes multifocal contact lenses providing a unique single distance vision refractive power for the first multifocal contact lens group (such as a group as illustrated in FIG. 10A). The aspheric power profile of each of the multifocal contact lenses within a single contact lens group provides a single Add power selected from a value from about 0.75 diopters to 2.00 diopters over a radial distance of 2.5 mm from the optic zone center for each lens of the series, and the Add power provided by the aspheric power profile of individual multifocal contact lenses of any of the first multifocal contact lens groups varies by no more than ±0.25 diopters compared to the Add power provided by a relative aspheric power profile of the plurality of multifocal contact lenses. The relative aspheric power profile being the average of power profiles of the plurality of multifocal contact lenses and in which the distance vision refractive power at a radial distance of 2.5 mm is fixed at 0.00 diopters. In addition, the aspheric power profile of the individual multifocal contact lenses of any of the first multifocal contact lens groups differs by no more than ±0.375 diopters compared to the relative aspheric power profile of the plurality of multifocal contact lenses along the power profile for each radial distance measured along the power profile.

In some methods, another step is provided, and is a step of forming a plurality of second multifocal contact lens groups, which as described above, have different power profiles than the power profiles of the first multifocal contact lens groups. Each of the second multifocal contact lens groups includes multifocal contact lenses providing a unique single distance vision refractive power for the second multifocal contact lens group, and each of said multifocal contact lenses of the second multifocal contact lens groups has an aspheric power profile that provides an AUC that is between 5% to 45% greater than an AUC of the relative aspheric power profile of the multifocal contact lenses of the first multifocal contact lens groups.

In the methods of the invention, the forming may include a step of designing the multifocal contact lenses to have an aspheric power profile in which the aspheric power profile of individual multifocal contact lenses of the plurality of multifocal contact lenses has a maximum rate of power change having an absolute value greater than 0.0 D/mm and less than 0.9 D/mm.

The methods may also include a step of providing the plurality of multifocal contact lenses as lens pairs that are effective to provide an improved visual acuity to a presbyopic patient compared to the visual acuity provided to the presbyopic patient by either multifocal contact lens of the pair, alone.

In the methods, the forming may include a step of polymerizing the polymerizable composition in contact lens mold assemblies having a contact lens shaped cavity in each assembly, and as illustrated in FIG. 9. Additionally, the method may include a step of shaping a contact lens mold member insert to provide the optic zone of the plurality of multifocal contact lenses, and forming a first contact lens mold member using the contact lens mold member insert, and placing the first contact lens mold member in contact with a second contact lens mold member to form a contact lens mold assembly, also as illustrated in FIG. 9. Or, in the present methods, the forming step may comprise polymerizing the polymerizable composition in a mold to form a polymerized composition, and machining the polymerized composition into a multifocal contact lens of the batch.

Any of the present manufacturing methods may further include a step of packaging individual multifocal contact lenses into primary contact lens packages, and placing a single group of packaged multifocal contact lenses, of either the first group or the second group, into a secondary package, in which the secondary package includes indicia identifying the single distance refractive power of the multifocal contact lens group, and optionally, the Add power of the multifocal contact lenses of the group.

Aspects of the present invention also relate to sets of multifocal contact lenses and related methods. One example of a set used in the context of the present invention is a fitting set, as understood by persons of ordinary skill in the art. Fitting sets are provided to ECPs such that the ECP can fit subjects with different contact lenses to determine which contact lenses provide an acceptable amount of vision improvement and comfort, as discussed herein. The present sets of multifocal contact lenses in accordance with the present invention include series of multifocal contact lenses, such as a series of multifocal contact lenses for the dominant eye of a presbyopic subject and a series of multifocal contact lenses for the non-dominant eye of the presbyopic subject. The two series can be present as distinct units, such as two separate series of lenses, or can be provided as a single unit, where all of the multifocal contact lenses are present in a single system, but the dominant eye series and the non-dominant eye series become more defined upon selection of two lenses for the presbyopic subject.

Thus, in accordance with the present disclosure, a set of the invention is now described. A set of multifocal contact lenses for improving vision of presbyopic subjects includes a dominant eye series and a non-dominant eye series. When the set is a fitting set, as understood by persons of ordinary skill in the art, the set can be understood to be a device or article of manufacture in which the first multifocal contact lenses and the second multifocal contact lenses are packaged together in the device to provide to an ECP. The ECP can select a first multifocal contact lens and a second multifocal contact lens, based on the teachings of the present disclosure, and use such multifocal contact lenses in a fitting procedure for the presbyopic subject.

As described herein, each of the multifocal contact lenses in each series includes an optic zone that has an optic zone center and an optic zone perimeter spaced radially away from the optic zone center. The optic zone perimeter defines a boundary between the optic zone and the peripheral zone of the contact lens. The optic zone has an aspheric power profile extending from the optic zone center towards the optic zone perimeter and provides a near vision refractive power and a distance vision refractive power such that each of said multifocal contact lenses has an Add power. The Add power is the absolute difference in power between the near vision refractive power and the distance vision refractive power, as described herein.

In the sets of the present invention, the dominant eye series includes a plurality of dominant eye patient lens sets (e.g., two or more dominant eye patient lens sets). The dominant eye patient lens sets correlate to the Add power requirements of presbyopic subjects, such as medium Add, high Add, and low Add. The dominant eye series can include dominant eye patient lens sets, such as medium and high Add sets, low and medium Add sets, low and high Add sets, or low, medium, and high Add sets. One example is illustrated in FIG. 8, as described further herein.

The plurality of dominant eye patient lens sets includes a first dominant eye patient lens set, such as a medium Add set. The first dominant eye patient lens set includes multifocal contact lens groups that include multifocal contact lenses providing unique distance vision refractive powers, as described herein for the batches of the present invention. Each contact lens group includes at least one multifocal contact lens. Since each group has a unique distance vision refractive power, the first dominant eye patient lens set can be understood to include a plurality of multifocal contact lenses having distance vision refractive powers from +20.00 D to −20.00 D, or any value therebetween. In some embodiments, the multifocal contact lenses of the first dominant eye patient lens set can have distance vision refractive powers from −10.00 D to +6.00 D in various increments, such as 0.25 D increments. Subsets of those ranges of distance vision refractive powers are also included in the scope of the present sets of multifocal contact lenses. Thus, for a medium Add patient lens set of the dominant eye series, the multifocal contact lenses of the medium Add patient lens set can be provided in a range of distance powers from +20.00 D to −20.00 D, as one example, from −10.00 D to +6.00 D. Similar ranges can be provided for the high Add patient lens sets, and the low Add patient lens sets.

The aspheric power profile of each of the multifocal contact lenses of the first dominant eye patient lens set provides a single Add power selected from a value from about 0.75 D to 2.00 D over a radial distance of 2.5 mm from the optic zone center for each lens of the series. This shape of the aspheric power profile can be understood with the description and drawings of FIGS. 1A-1F, and 10B-10D, and 11B. In some embodiments, the Add power is a value from 1.00 D to 1.90 D. For example, the Add power may be about 1.00 D, 1.10 D, 1.20 D, 1.25 D, 1.30 D, 1.40 D, 1.50 D. 1.60 D. 1.70 D. 1.75 D, 1.80 D, or 1.90 D, or any value therebetween. As another example, in some embodiments of the present sets, the Add power is a value in a range from 0.75 D to 1.75 D.

The Add power provided by the aspheric power profile of the individual multifocal contact lenses of the first dominant eye patient lens set varies by no more than ±0.25 D, as compared to the Add power provided by the relative aspheric power profile of the multifocal contact lenses of the first dominant eye patient lens set. Similar to that described herein, the relative aspheric power profile corresponds to the average of power profiles of a plurality of multifocal contact lenses of the first dominant eye patient lens set, in which the distance vision refractive power at a radial distance of 2.5 mm is fixed at 0.00 D.

The non-dominant eye series of the sets of the present invention also includes a plurality of patient lens sets. More specifically, the non-dominant eye series includes a plurality of non-dominant eye patient lens sets correlating to the Add power requirements of presbyopic subjects, such as medium Add, high Add, and low Add, as described above for the dominant eye patient lens sets. The plurality of non-dominant eye patient lens sets includes a first non-dominant eye patient lens set that includes multifocal contact lenses. The multifocal contact lenses of the first non-dominant eye patient lens set each have an aspheric power profile that provides a single Add power selected from a value from about 0.75 D to 2.00 D over a radial distance of 2.5 mm from the optic zone center. The Add power of these lenses is similar or the same as those for the dominant eye patient lens sets. However, the distance vision refractive power provided by the aspheric power profile of the multifocal contact lenses of the first non-dominant eye patient lens set is offset by about +0.25 D to about +1.25 D relative to the distance power correction for the presbyopic subject.

The set of the present invention may also include a second non-dominant eye patient lens set as a component of the non-dominant eye series. In such an embodiment, each of the multifocal contact lenses of the second non-dominant eye patient lens set has an aspheric power profile that provides an AUC that is between 5% to 45% greater than the AUC of the relative aspheric power profile of the multifocal contact lenses of the first non-dominant eye patient lens set. In some embodiments, the AUC is less than 35% greater, and in some further embodiments, the AUC of the aspheric power profile of the lenses of the second non-dominant eye patient lens set is less than 30% greater than the relative aspheric power profile. One example of such an aspheric power profile of the second non-dominant eye patient lens sets is illustrated at Lens C in FIG. 11B.

In the sets that include a second non-dominant eye patient lens set, the aspheric power profile of each of the multifocal contact lenses of the second non-dominant eye patient lens set provides a single Add power of no greater than 2.00 diopters over a radial distance of 2.5 mm from the optic zone center for each lens of the second non-dominant eye patient lens set, and the aspheric power profile of the multifocal contact lenses of the second non-dominant eye patient lens set is offset by about +0.25 diopters to about +1.25 diopters relative to the distance power correction for the presbyopic subject.

In any of the sets of the present invention, the relative aspherical power profile of the multifocal contact lenses of the dominant eye series and the relative aspherical power profile of the multifocal contact lenses of the non-dominant eye series differ by less than ±0.375 D compared to each other along the power profile for every radial distance measured along the power profile.

The non-dominant eye series of any of the preceding sets may also include a third non-dominant eye patient lens set, such as a low Add patient lens set, that includes multifocal contact lenses. Each of the multifocal contact lenses of the third non-dominant eye patient lens set have an average aspheric power profile that differs by less than ±0.375 D compared to the average aspheric power profile of the multifocal contact lenses of the first dominant eye patient lens set along the power profile for every radial distance measured along the power profile.

In any of the preceding sets of multifocal contact lenses, the aspheric power profile of the multifocal contact lenses of the non-dominant eye series has a maximum rate of power change greater than 0.00 D/mm and less than 1.00 D/mm. For example, the maximum rate of power change may be less than 0.95 D/mm. In some embodiments, the maximum rate of power change may be represented by an absolute value that is from about 0.7 D/mm to about 0.8 D/mm. In some embodiments, the maximum rate of power change occurs at a radial distance from about 2.0 mm to about 2.5 mm. These embodiments may be useful for the medium Add patient lens sets and the low Add patient lens sets. In some embodiments, the maximum rate of power change may be represented by an absolute value that is from about 0.7 D/mm to about 0.9 D/mm, and it may be present at a radial distance from about 0.8 mm to about 2.2 mm. These embodiments may be useful for the high Add patient lens set, if so desired.

In any of the preceding sets, the multifocal contact lenses of the dominant eye series and the multifocal contact lenses of the non-dominant eye series can be grouped in lens pair sets. The lens pair sets include a first patient lens pair set, such as for medium Add presbyopes, a second patient lens pair set, such as for high Add presbyopes, and a third patient lens pair set, such as for low Add presbyopes, such that any pair of multifocal contact lenses of the lens pair sets is effective to provide an improved visual acuity to a presbyopic subject compared to the visual acuity provided to the presbyopic subject by either multifocal contact lens of the pair, alone.

As described herein, in any of the present lens sets, the multifocal contact lenses can be near-center asphere lenses, can include a toric optic zone for correcting astigmatism, or can be hydrogel or silicone hydrogel contact lenses, or combinations thereof.

In some embodiments of the sets of the present invention, the multifocal contact lenses of the dominant eye series and the multifocal contact lenses of the non-dominant eye series are grouped in lens pair sets, including a medium Add lens pair set, and a low Add lens pair set, and a high Add lens pair set. The high Add lens pair set includes a) a first multifocal contact lens providing an Add power correction from about 1.50 D to 2.00 D and has an aspheric power profile effective to improve visual acuity of a dominant eye of a presbyopic subject, and b) a second multifocal contact lens providing an Add power correction from about 1.50 D to 2.00 D and having an aspheric power profile in which the distance vision power correction is offset by about +0.25 D to about +1.25 D relative to the distance power correction for the presbyopic subject.

In some embodiments of the present lens sets, multifocal contact lenses of the dominant eye series and the multifocal contact lenses of the non-dominant eye series are grouped in lens pair sets, including a medium Add lens pair set, and a low Add lens pair set, and a high Add lens pair set, said high Add lens pair set including two multifocal contact lenses, at least one of the two multifocal contact lenses providing an Add power correction greater than 2.00 diopters.

One example of a set in accordance with the present invention is illustrated in FIG. 8. In this example, the set may be understood to be a fitting set. A set 30 includes a dominant eye series 32 and a non-dominant eye series 34. The dominant eye series 32 includes a plurality of dominant eye patient lens sets 32A, 32B, and 32C. The non-dominant eye series includes a plurality of non-dominant eye patient lens sets 34A, 34B, and 34C. The patient lens sets each correspond to the Add power requirements of presbyopic subjects. For example, the patient lens sets 32A and 34A correspond to the low Add presbyopes; the patient lens sets 32B and 34B correspond to the medium Add presbyopes; and the patient lens sets 32C and 34C correspond to the high Add presbyopes. As illustrated in this set 30, each of the lenses share a common single aspheric power profile, represented by the label Lens A, as described herein. For the patient lens set 34B, for medium Add subjects, the non-dominant eye is over corrected by +0.25 D to +1.25 D, and preferably is over corrected by +0.75 D. For the patient lens set 34C, for high Add subjects, the non-dominant eye is over corrected by +0.25 D to +1.25 D, and preferably is over corrected by +0.75 D or +1.00 D.

Another example of a lens set in accordance with the present invention is illustrated in FIG. 13. This lens set 130 is identical to the lens set 30 of FIG. 8, except that for the non-dominant eye series patient lens set for high Add presbyopes, the lenses of this patient lens set 134C have a different aspheric power profile, as represented by the label Lens C, which can be in reference to the Lens C power profile in FIG. 11B. Although the power profile of Lens C provides a greater AUC than the Lens A power profile, it is still over corrected for distance vision from about +0.25 D to about +1.25 D, and preferably, the over correction is +0.75 D or +1.00 D.

As described herein, in addition to the monocular differences in visual acuity, and the improvement in binocular visual acuity, the present multifocal contact lenses are manufactured with reduced variability within batches of lenses and across ranges of distance powers of lenses. For example, unlike some multifocal contact lenses that vary the Add power as the distance power of the lens in a lens set changes, the present multifocal contact lenses maintain a substantially constant Add power across different distance powers of the lenses. In addition, in the present lens sets, less than three Add powers are required within a series of lenses, unlike some other existing multifocal contact lenses. Further, the variability in power profile shape is reduced among lenses of different distance powers unlike existing multifocal contact lenses.

In accordance with the present teachings and present lens sets, the invention also relates to methods of providing multifocal contact lenses for improving vision of presbyopic subjects. Such methods include a step of manufacturing a plurality of multifocal contact lenses, as herein described. Preferably, the multifocal contact lenses are manufactured using a static cast molding process, as illustrated by way of example in FIG. 9. Each of the multifocal contact lenses includes an optic zone having an optic zone center and an optic zone perimeter spaced radially away from the optic zone center. The optic zone perimeter defines a boundary between the optic zone and a peripheral zone of the contact lens. The optic zone has an aspheric power profile extending from the optic zone center towards the optic zone perimeter and provides a near vision refractive power and a distance vision refractive power such that each of said multifocal contact lenses has an Add power, wherein the Add power is the absolute difference in power between the near vision refractive power and the distance vision refractive power. The method further includes a step of packaging the multifocal contact lenses in contact lens packages to produce packaged multifocal contact lenses. The contact lens packages can include primary packaging, such as blister packs or vials, secondary packaging, such as cartons, containing one or more primary packages of contact lenses, or tertiary packaging, such as boxes, containing one or more secondary packages.

The packaged multifocal contact lenses are provided to a contact lens distributor, a contact lens retailer, or an ECP, or combinations thereof. The packaged contact lenses include a dominant eye series of multifocal contact lenses and a non-dominant eye series of multifocal contact lenses.

The dominant eye series includes a plurality of dominant eye patient lens sets correlating to Add power requirements of presbyopic subjects, as described above. The plurality of patient lens sets includes a first dominant eye patient lens set that includes multifocal contact lens groups that include multifocal contact lenses providing unique distance vision refractive powers. Each group includes at least one multifocal contact lens, and the aspheric power profile of each of the multifocal contact lenses of the first dominant eye patient lens set provides a single Add power selected from a value from about 0.75 diopters to 2.00 diopters over a radial distance of 2.5 mm from the optic zone center for each lens of the series. The Add power provided by the aspheric power profile of individual multifocal contact lenses of the first dominant eye patient lens set varies by no more than ±0.25 D compared to the Add power provided by a relative aspheric power profile of the multifocal contact lenses of the first dominant eye patient lens set. Where, as described herein, the relative aspheric power profile corresponds to the average of power profiles of a plurality of multifocal contact lenses of the first dominant eye patient lens set and in which the distance vision refractive power at a radial distance of 2.5 mm is fixed at 0.00 D.

The non-dominant eye series of the present methods includes a plurality of patient lens sets correlating to Add power requirements of presbyopic subjects, as described herein. The plurality of patient lens sets includes a first non-dominant eye patient lens set that includes multifocal contact lenses, each of the multifocal contact lenses of the first non-dominant eye patient lens set have an aspheric power profile that provides a single Add power selected from a value from about 0.75 diopters to 2.00 diopters over a radial distance of 2.5 mm from the optic zone center for each lens of the first non-dominant eye patient lens set, and the distance vision refractive power provided by the aspheric power profile of the multifocal contact lenses of the first non-dominant eye patient lens set is offset by about +0.25 diopters to about +1.25 diopters relative to the distance power correction for a presbyopic subject.

In some embodiments of the present methods, the non-dominant eye series of the provided packaged contact lenses includes a second non-dominant eye patient lens set that includes multifocal contact lenses. Each of the multifocal contact lenses of the second non-dominant eye patient lens set have an aspheric power profile that provides an AUC that is between 5% to 45% greater than an AUC of the relative aspheric power profile of the multifocal contact lenses of the first non-dominant eye patient lens set, as described hereinabove.

In the foregoing method, the aspheric power profile of each of the multifocal contact lenses of the second non-dominant eye patient lens set can provide a single Add power of no greater than 2.00 D over a radial distance of 2.5 mm from the optic zone center for each lens of the second non-dominant eye patient lens set, and the aspheric power profile of the multifocal contact lenses of the second non-dominant eye patient lens set is offset by about +0.25 D to about +1.25 D relative to the distance power correction for the presbyopic subject.

In any of the preceding methods, the relative aspherical power profile of the multifocal contact lenses of the dominant eye series and the relative aspherical power profile of the multifocal contact lenses of the non-dominant eye series can differ by less than ±0.375 D compared to each other along the power profile for every radial distance measured along the power profile.

In any of the preceding methods, the non-dominant eye series can include a third non-dominant eye patient lens set that includes multifocal contact lenses, wherein each of the multifocal contact lenses of the third non-dominant eye patient lens set have an average aspheric power profile that differs by less than ±0.375 D compared to the average aspheric power profile of the multifocal contact lenses of the first dominant eye patient lens set along the power profile for every radial distance measured along the power profile.

As discussed herein, in certain embodiments the aspheric power profile of the multifocal contact lenses of the non-dominant eye series has an absolute maximum rate of power change less than 1.0 D/mm, for example from 0.7 to 0.9 D/mm. As a further example, the aspheric power profile may have an absolute value from about 0.7 diopters/mm to about 0.8 diopters/mm at a radial distance of about 2.0 mm to about 2.5 mm.

In some methods, the multifocal contact lenses of the dominant eye series and the multifocal contact lenses of the non-dominant eye series are grouped in lens pair sets, including a first patient lens pair set, a second patient lens pair set, and a third patient lens pair set, such that any pair of multifocal contact lenses of the lens pair sets is effective to provide an improved visual acuity to a presbyopic subject compared to the visual acuity provided to the presbyopic subject by either multifocal contact lens of the pair, alone.

The present invention also provides additional methods of using the multifocal contact lenses. For example, such methods can be understood to relate to the perspective of an ECP or other similar person or entity responsible for eye examinations and prescribing contact lenses. Such methods do not involve a step of treating a presbyopic subject since the multifocal contact lenses are self-administered by the subject to provide temporary vision correction or vision improvement (i.e., vision correction when the subject is wearing the multifocal contact lenses). The subject's vision remains uncorrected when the subject removes the multifocal contact lenses.

A method of prescribing multifocal contact lenses to a presbyopic subject as provided by the present invention, and as understood from the disclosure herein, includes a step of fitting the presbyopic subject with a pair of multifocal contact lenses. The presbyopic subject is a medium Add or high subject, or stated differently, the presbyopic subject requires an Add power correction of at least 1.25 D, such as from 1.25 D to 3.00 D. Thus, the presbyopic subject requires an Add power correction of one of 1.25 D, 1.50 D, 1.75 D, 2.00 D, 2.25 D, 2.50 D, 2.75 D, or 3.00 D. Many presbyopes require an Add power correction in accordance with these methods from 1.25 D to 2.50 D.

Of the pair of multifocal contact lenses so fit, a first multifocal contact lens includes an aspheric power profile derived from a first nominal, or target, aspheric power profile, and the second multifocal contact lens of the pair comprises a second aspheric power profile derived from the first nominal aspheric power profile. Although the aspheric power profiles of the first and second multifocal contact lenses are derived from a single nominal aspheric power profile, the aspheric power profile of the second multifocal contact lens provides a distance vision refractive power offset by about +0.25 D to about +1.25 D relative to the distance power correction for the non-dominant eye of the presbyopic subject. Thus, the monocular distance visual acuity is different for each eye with each contact lens (e.g., the dominant eye is fully corrected for distance vision, and the non-dominant eye is over-corrected for distance vision), and binocular summation is still maintained.

The aspheric power profiles of the first and second multifocal contact lenses are substantially similar, as described above with respect to FIGS. 10A-10D. It can be understood in general terms that the first and second multifocal contact lenses, which may or may not have different distance vision refractive powers (depending on the distance vision correction needed by the subject in each eye), have aspheric power profiles that are derived from a single nominal or target aspheric power profile used in the design of the multifocal contact lenses. In addition, although they are derived from a single nominal aspheric power profile, the aspheric power profiles of the first and second multifocal contact lenses may vary slightly due to manufacturing tolerances and inspection techniques, as described herein. However, unlike existing multifocal contact lenses, the present multifocal contact lenses have substantially similar aspheric power profiles across the range of distance vision refractive powers (e.g., −20.00 D to +20.00 D; or −10.00 D to +6.00 D; or −6.00 D to 0.00 D, etc.) and for presbyopic subjects requiring different amounts of Add power correction. In comparison, some existing multifocal contact lenses have a first aspheric power profile with a relatively low amount of Add power for low Add presbyopes (e.g., presbyopes requiring an Add power correction from 0.25 D to 1.00 D), a second aspheric power profile with a modest amount of Add power for medium Add presbyopes (e.g., presbyopes requiring an Add power correction from 1.25 D to 1.75 D), and a third aspheric power profile with a large amount of Add power for high Add presbyopes (e.g., presbyopes requiring an Add power correction of at least 2.00 D). Thus, with the present multifocal contact lenses, the fitting process is simpler than existing fitting processes for existing multifocal contact lenses. In some methods, it can be understood that with the present multifocal contact lenses and sets of multifocal contact lenses, less than three different patient lens sets are provided for low, medium, and high Add presbyopic subjects. This is because the multifocal contact lenses have similar lens designs or aspheric power profiles, unlike some existing multifocal contact lenses that have three different designs or power profiles for the three different groups of prebyopes. An example of this simplified fitting system is illustrated in FIG. 8, as described herein. As can be understood from the drawings, a single lens design (Lens A) having a power profile as illustrated in FIGS. 10B and 10C can be fit in accordance with the present invention for each eye of low, medium, and high Add presbyopes.

During the fitting process, an ECP can evaluate the vision provided with the individual multifocal contact lenses and the pair of multifocal contact lenses, as well as the comfort and fitting characteristics of the multifocal contact lenses. If the vision provided by the contact lenses is acceptable to the presbyopic subject, and the comfort and the fit is acceptable, the ECP can issue a prescription for the present multifocal contact lenses. As understood in the art, the fitting process can include steps of recording corneal diameter, determining the distance power correction, near power correction, intermediate power correction, cylinder power correction and prismatic power correction necessary to correct the subject's vision, observing the centration of the lens(es), or observing the movement of the lens(es), or any combination thereof, in addition to others.

In the present methods, some methods may optionally include a second step of fitting a pair of multifocal contact lenses to the presbyopic subject. For example, a method may include a step of fitting a second pair of multifocal contact lenses, where the second pair of multifocal contact lenses includes a first multifocal contact lens have the same aspheric power profile as the first aspheric power profile of the first multifocal contact lens of the first pair, and the second contact lens of the second pair has an aspheric power profile that provides an AUC that is between 5% to 45% greater than the AUC of the aspheric power profile of the first multifocal contact lens of the second pair.

The foregoing embodiment of the methods can be understood with reference to FIG. 11B and FIG. 13. For example, if the presbyope is not satisfied with the fitting characteristics of the first multifocal lens pair, the presbyope can be fit with a second multifocal contact lens pair, such as a pair consisting of a first multifocal contact lens having a an aspheric power profile as represented by Lens A in FIG. 11B, and a second multifocal contact lens having an aspheric power profile represented by Lens C in FIG. 11B. This may be particularly useful in high Add presbyopes, as reflected in the exemplary fitting set depicted in FIG. 13.

As illustrated in FIG. 13, if the presbyopic subject is fit with a second pair of multifocal contact lenses in accordance with the present invention, the aspheric power profile of the second multifocal contact lens of the second pair is labeled to provide a distance vision refractive power that is offset by about +0.25

D to about +1.25 D relative to the distance power correction for the non-dominant eye of the presbyopic subject, which is similar in principle to the second multifocal contact lens of the first pair.

In addition, some of the present methods may further include a step of conducting an eye examination of the presbyopic subject to determine which eye of the presbyopic subject is the dominant eye. As discussed hereinabove, ocular dominance can be determined using any conventional technique, including the lens fogging technique.

The methods may also include a step of determining the prescription of the presbyopic subject and prescribing the first and second multifocal contact lenses to the presbyopic subject. The first and second multifocal contact lenses can be from either the first lens pair or the second lens pair described herein.

As can be understood from the present disclosure, the first and second multifocal contact lenses may be near-center aspheres, one or both may include a toric optic zone effective in correcting astigmatism of the presbyopic subject, or may be either hydrogel contact lenses or silicone hydrogel contact lenses, or combinations thereof.

Some of the present methods may also include a step of providing the multifocal contact lenses to the presbyopic subject for self administration by the subject. As explained above, the present methods are not methods of medical treatment, and thus, in some contexts, the step of administration by the presbyopic subject may is not claimed or a subject of the present invention. Some further methods may include a step of obtaining data from the subject to determine the prescription of the presbyopic subject.

In addition to the foregoing, some embodiments of the present multifocal contact lenses can have aspheric power profiles that are free of a transition zone within the optic zone. This is possible due to the relatively slow rate of change of diopters/mm over a radial distance of 2.5 mm, as compared to multifocal contact lenses with greater rates of change. However, although these embodiments do not have transition zones in the optic zone, transitions or blends may be provided at junctions, such as at a junction between the optic zone perimeter and the peripheral zone, or a junction between the peripheral zone and the edge region of the contact lenses, or combinations thereof.

EXAMPLES

The following Examples illustrate certain aspects and advantages of the present invention, which should be understood not to be limited thereby.

Example 1

Multifocal Contact Lens Manufacture

Multifocal contact lenses having an aspheric power profile, as described hereinabove, and as illustrated in FIGS. 1A-1F are produced using a static cast molding process.

Metal inserts are machined to form optical quality surfaces corresponding to the surfaces of the multifocal contact lenses. A nominal or target or pre-determined aspheric power profile is used to form an aspheric power profile within the optic zone portion of the optical quality surface of the inserts. An example of a nominal aspheric power profile is illustrated in FIGS. 1C-1F.

The inserts are placed in an injection molding machine to form contact lens mold cavities when inserts are placed near each other. Contact lens mold material, such as pellets of polystyrene, polypropylene, vinyl alcohol polymers, and the like, are melted and injected into the contact lens mold cavities to form female contact lens mold members and male contact lens mold members. The female contact lens mold member has a concave optical quality surface corresponding to the anterior surface of a contact lens. The male contact lens mold member has a convex optical quality surface corresponding to the posterior surface of a contact lens.

A volume of a polymerizable lens forming composition is placed in contact with the concave surface of a female mold member. A male mold member is placed in contact with the female mold member to form a contact lens mold assembly comprising a contact lens shaped cavity containing the polymerizable lens forming composition. Multifocal contact lenses are produced from polymerizable lens forming compositions having a U.S. Adopted Name (USAN) of omafilcon A, or comfilcon A, enfilcon A, or stenfilcon A. The resulting multifocal contact lenses are hydrogel contact lenses or silicone hydrogel contact lenses.

Contact lens mold assemblies are placed in thermal ovens or ultraviolet ovens to allow the polymerizable compositions to polymerize by heat or ultraviolet radiation, respectively. The contact lens molds are exposed to curing conditions for about 1 hour or more.

After polymerizing the precursor compositions, the contact lens mold assemblies are demolded to separate the male and female mold members. The polymerized contact lens product is delensed from one of the mold members by immersing the lens and mold member in a delensing liquid, or mechanically, such as by compressing the mold member to release the contact lens product.

The delensed lens product is then either placed in a contact lens package, such as in a cavity of a blister pack which is then filled with a contact lens packaging solution, or is optionally washed with water, alcohol, or combinations thereof, prior to placement in the contact lens package. The contact lens packages, each containing a single multifocal contact lens, is then sealed, and sterilized by autoclaving. The sterilized packages are placed in secondary packaging, such as cartons. The secondary packaging is then placed in tertiary packaging, such as boxes. The contact lens packages are also placed in display devices containing contact lens storage areas. Such display devices with the contact lenses can be understood to be fitting sets.

The multifocal contact lenses are manufactured with different distance vision refractive powers or distance powers. The distance vision refractive powers range from −20.00 D to +20.00 D. The multifocal contact lenses are manufactured in batches, each batch having a different distance vision refractive power. For example, batches are manufactured having distance vision refractive powers from −20.00 D to −10.00 D in 1 D increments; from −10.00 D to +6.00 D in 0.25 D increments, and from +6.00 D to +20.00 D in 1 D increments.

Example 2

Visual Acuity—Medium Add Subjects

A group of presbyopic subjects who require an Add power correction of +1.25 D to +1.75 D, as determined by an eye care practitioner (ECP; the subjects have Add power prescriptions of either +1.25 D, +1.50 D, or +1.75 D), are selected for fitting with the present multifocal contact lenses, as described hereinabove and illustrated in FIGS. 1A-1F. The multifocal contact lenses so fit have an Add power from about 1.00 D to less than 1.25 D, for example, about 1.15 D, over the central 5 mm diameter of the optic zone (2.5 mm radial distance).

The ECP determines ocular dominance, distance vision refractive power correction, and Add power requirements for each of the subjects. The dominant eye is optimally or fully corrected for distance vision with a first multifocal contact lens of the present invention (e.g., the distance vision refractive power of the first multifocal contact lens corresponds to the distance vision prescription of the dominant eye, as determined by the ECP). That is, a first multifocal contact lens having a −3.00 D distance vision refractive power is provided for the subject's dominant eye if the eye requires about −3.00 D vision correction to achieve acceptable monocular visual acuity (such as, 20/30 or better using Snellen notation). A second multifocal contact lens of the present invention is selected for the non-dominant eye such that the distance vision refractive power of the multifocal contact lens is over-corrected relative the distance vision prescription of the non-dominant eye. The over-correction is from about +0.25 D to about +1.25 D; for example, the over-correction can be +0.25 D, +0.50 D, +0.75 D, +1.00 D, or +1.25 D. In this Example, the over-correction is +0.75 D. Therefore, if a subject requires a −2.00 D distance vision correction for the non-dominant eye, the subject is fit with the second multifocal contact lens having a distance vision refractive power of −1.25 D. With this second multifocal contact lens, which has an Add power less than 1.25 D, the subjects achieve acceptable monocular near vision correction (such as, 20/30 or better using Snellen notation). These first and second multifocal contact lenses are illustrated as Lens A in FIGS. 2A and 2B.

The same group of subjects is fit with a pair of multifocal contact lenses having a greater Add power and a greater rate of power change (1st order derivative) compared to the pair described in the preceding two paragraphs. The two lenses of this pair of multifocal contact lenses are illustrated as Lens B in FIGS. 2A and 2B. As shown in FIG. 2B, and as described above, Lens B has greater Add power than Lens A, has a greater rate of power change than Lens A, and correspondingly, has a greater area under the curve (AUC) than Lens A, as depicted by the shaded areas of the power profiles in FIGS. 2A and 2B.

Visual acuity is determined with high illumination and high contrast for subjects wearing a pair of the Lens A lenses, and then the high illumination, high contrast visual acuity is determined for the subjects wearing a pair of the Lens B lenses. The visual acuity is determined at distant or far viewing distances (e.g., at least 6 meters), at near viewing distances (e.g., at 60 centimeters or less), and at intermediate viewing distances (e.g., at a distance between 60 centimeters and 1.5 meters). Visual acuity results are illustrated in FIG. 3 and the data are represented as log MAR values. 20/20 visual acuity is reflected as 0.00 on the log MAR chart, and better visual acuity is represented by relatively more negative log MAR values.

As shown in FIG. 3, pairs of Lens A lenses (e.g., multifocal contact lenses in accordance with the present invention) provide improved visual acuity compared to Lens B lenses at distant and intermediate viewing distances (that is, the Lens A log MAR values are more negative than Lens B log MAR values). At near viewing distances, the Lens A log MAR values are slightly more positive than the Lens B log MAR values, but the difference is not statistically significant.

Visual acuity is also determined with low illumination and low contrast for the subjects for Lens A lenses and Lens B lenses at distant and near viewing distances (see FIG. 4). Although both log MAR values are greater than zero, the Lens A lenses provided improved distant visual acuity at low illumination and low contrast (more negative log MAR value), and equal near visual acuity at low illumination and low contrast, compared to Lens B lenses.

Visual acuity measurements were actually conducted as set forth above in this Example 2 and the results actually obtained were as predicted above.

Thus, the Lens A lenses, which are corrected for distance vision in the dominant eye, and over-corrected for distance vision in the non-dominant eye, and are binocularly under-corrected for the Add power requirement of the subjects (without including the over-correction of the non-dominant eye, as described herein), provide clinically acceptable near visual acuity without compromising distance and intermediate visual acuity compared to Lens B lenses, which have an Add power that more closely corresponds to the Add power requirements of the present medium Add subjects.

Example 3

Visual Acuity—High Add Subjects

A group of presbyopic subjects who require an Add power correction of +2.00 D or more, as determined by an eye care practitioner (ECP; the subjects have Add power prescriptions of either +2.00 D, +2.25 D, +2.50 D, +2.75 D, or +3.00 D) are selected for fitting with the present multifocal contact lenses, as described hereinabove and illustrated in FIGS. 1A-1F. The multifocal contact lenses so fit have an Add power from about 1.00 D to less than 1.25 D, for example, about 1.15 D, over the central 5 mm diameter of the optic zone. These lenses are the same design, or same power profile, as the Lens A lenses described in Example 2.

This high Add group of subjects is fit for Lens A lenses or Lens B lenses, as described in Example 2. The primary difference between Example 2 and Example 3 is that the subjects of Example 3 require higher Add power correction, as determined by the ECP.

Similar to the results described in Example 2, high Add subjects wearing a pair of Lens A lenses (i.e., optimally or best corrected for distance vision in the dominant eye, and over-corrected for distance vision in the non-dominant eye by +0.75 D) exhibit improved visual acuity for distant viewing distances under high illumination, high contrast, and low illumination, low contrast (FIGS. 5 and 6, respectively). The Lens A lenses exhibit similar log MAR values at intermediate distances with high illumination and high contrast, and similar log MAR values at near distances with both high illumination, high contrast, and low illumination, low contrast.

Visual acuity measurements were actually conducted as set forth above in this Example 3 and the results actually obtained were as predicted above.

Thus, the Lens A lenses, which are optimally or best corrected for distance vision in the dominant eye, and over-corrected for distance vision in the non-dominant eye, and are binocularly under-corrected for the Add power requirement of the subjects, provide clinically acceptable near visual acuity without compromising distance and intermediate visual acuity compared to Lens B lenses, which have an Add power that more closely corresponds to the Add power requirements of the present high Add subjects.

Example 4

A similar study was conducted as described in Examples 2 and 3 with 49 subjects (age range 42-65). Substantially similar results were obtained to those described in Examples 2 and 3. For example, the results for all of the subjects demonstrated that the Lens A lenses provided improved distance visual acuity compared to the Lens B lenses, without compromising intermediate and near visual acuity (e.g., the Lens A lenses and Lens B lenses demonstrated equivalent performance for intermediate visual acuity and near visual acuity). When the data for the subjects were grouped into Medium Add subjects (requiring an Add power correction of +1.25 D to +1.75 D) and High Add subjects (requiring an Add power correction of +2.00 D to +2.50 D), the Lens A lenses provided significantly improved high contrast distance visual acuity compared to the Lens B lenses. The low contrast distance visual acuity was significantly improved for High Add subjects, and there was no observed significant difference in low contrast distance visual acuity for Medium Add subjects. For high contrast intermediate visual acuity, Lens A lenses and Lens B lenses performed similarly without any observed significant difference. For high contrast near visual acuity, Medium Add subjects reported similar visual acuity with Lens A lenses and Lens B lenses, and High Add subjects appeared to show a significant improvement with Lens B lenses. For low contrast visual acuity, Lens A lenses and Lens B lenses performed similarly without any observed significant difference in visual acuity.

Although the disclosure herein refers to certain illustrated embodiments, it is to be understood that these embodiments are presented by way of example and not by way of limitation. The intent of the foregoing detailed description, although discussing exemplary embodiments, is to be construed to cover all modifications, alternatives, and equivalents of the embodiments as may fall within the spirit and scope of the invention as defined by the claims.

A number of publications and patents have been cited hereinabove. Each of the cited publications and patents are hereby incorporated by reference in their entireties.

What is claimed is:

1. A batch of multifocal contact lenses for improving vision of presbyopic subjects, comprising:
    a plurality of multifocal contact lenses, each of said multifocal contact lenses comprising an optic zone having a radius extending from an optic zone center to an optic zone perimeter spaced radially away from the optic zone center and defining a boundary between the optic zone and a peripheral zone, said optic zone having an aspheric power profile extending from the optic zone center towards the optic zone perimeter and providing a near vision refractive power and a distance vision refractive power such that the optic zone of each of said multifocal contact lenses has an Add power, said Add power being the absolute difference in power between the near vision refractive power and the distance vision refractive power;
    said plurality of multifocal contact lenses comprising a plurality of first multifocal contact lens groups, each first multifocal contact lens group comprising multifocal contact lenses providing a unique single distance vision refractive power for the first multifocal contact lens group,
        and the aspheric power profile of each of said multifocal contact lenses within a single contact lens group provides a single Add power selected from a value from about 0.75 diopters to 2.00 diopters over a radial distance of 2.5 mm from the optic zone center for each lens of the contact lens group,
        and the Add power provided by the aspheric power profile of individual multifocal contact lenses of any of the first multifocal contact lens groups varies by no more than ±0.25 diopters compared to the Add power provided by a relative aspheric power profile of the plurality of multifocal contact lenses, said relative aspheric power profile being the average of power profiles of the plurality of multifocal contact lenses and in which the distance vision refractive power at a radial distance of 2.5 mm is fixed at 0.00 diopters,
        and the aspheric power profile of the individual multifocal contact lenses of any of the first multifocal contact lens groups differs by no more than ±0.375 diopters compared to the relative aspheric power profile of the plurality of multifocal contact lenses along the power profile for each radial distance measured along the power profile.

2. The batch of claim 1, wherein the plurality of multifocal contact lenses further comprises a plurality of second multifocal contact lens groups, each of said second multifocal contact lens groups comprising multifocal contact lenses providing a unique single distance vision refractive power for the second multifocal contact lens group, and each of said multifocal contact lenses of said second multifocal contact lens groups having an aspheric power profile that provides an area under the curve that is between 5% to 45% greater than an area under the curve of the relative aspheric power profile of the multifocal contact lenses of the first multifocal contact lens groups.

3. The batch of claim 2, wherein the area under the curve of the multifocal contact lenses of said second multifocal contact lens groups is less than 35% greater than the area under the curve of the relative aspheric power profile of the multifocal contact lenses of the first multifocal contact lens groups.

4. The batch of 1, wherein the aspheric power profile of individual multifocal contact lenses of the plurality of multifocal contact lenses have a maximum rate of power change having an absolute value greater than 0.0 diopters/mm and less than 0.9 diopters/mm.

5. The batch of claim 1, wherein the plurality of multifocal contact lenses are provided as lens pairs effective to provide an improved binocular visual acuity to a presbyopic subject when both lenses are worn simultaneously compared to the monocular visual acuity provided to the presbyopic subject by either multifocal contact lens of the pair, alone.

6. The batch of claim 1, wherein the multifocal contact lenses of the batch are near-center aspheric multifocal contact lenses.

7. The batch of claim 1, wherein the single distance vision refractive power of the multifocal contact lenses is a value selected from −20.00 diopters to +20.00 diopters.

8. The batch of claim 1, wherein the plurality of multifocal contact lenses comprises multifocal contact lenses that include a toric optic zone effective in correcting astigmatism of the presbyopic subject.

9. The batch of claim 1, wherein the multifocal contact lenses are hydrogel contact lenses.

10. The batch of claim 1, wherein the multifocal contact lenses are silicone hydrogel contact lenses.

11. The batch of claim 1, wherein each of the lenses of the plurality of multifocal contact lenses has a single aspheric power profile.

12. The batch of claim 1, wherein the optic zone has a radius of from 3.5 mm to 4.5 mm.

13. A method of manufacturing a batch of multifocal contact lenses for improving vision of presbyopic subjects, comprising:
    forming a plurality of multifocal contact lenses from a polymerizable composition, each of said multifocal contact lenses comprising an optic zone having a radius extending from an optic zone center to an optic zone perimeter spaced radially away from the optic zone center and defining a boundary between the optic zone and a peripheral zone, said optic zone having an aspheric power profile extending from the optic zone center towards the optic zone perimeter and providing a near vision refractive power and a distance vision refractive power such that the optic zone each of said multifocal contact lenses has an Add power, said Add power being the absolute difference in power between the near vision refractive power and the distance vision refractive power;

said plurality of multifocal contact lenses comprising a plurality of first multifocal contact lens groups, each first multifocal contact lens group comprising multifocal contact lenses providing a unique single distance vision refractive power for the first multifocal contact lens group, and the aspheric power profile of each of said multifocal contact lenses within a single contact lens group provides a single Add power selected from a value from about 0.75 diopters to 2.00 diopters over a radial distance of 2.5 mm from the optic zone center for each lens of the series, and the Add power provided by the aspheric power profile of individual multifocal contact lenses of any of the first multifocal contact lens groups varies by no more than ±0.25 diopters compared to the Add power provided by a relative aspheric power profile of the plurality of multifocal contact lenses, said relative aspheric power profile being the average of power profiles of the plurality of multifocal contact lenses and in which the distance vision refractive power at a radial distance of 2.5 mm is fixed at 0.00 diopters, and the aspheric power profile of the individual multifocal contact lenses of any of the first multifocal contact lens groups differs by no more than ±0.375 diopters compared to the relative aspheric power profile of the plurality of multifocal contact lenses along the power profile for each radial distance measured along the power profile.

14. The method of claim 13, further comprising forming a plurality of second multifocal contact lens groups, each of said second multifocal contact lens groups comprising multifocal contact lenses providing a unique single distance vision refractive power for the second multifocal contact lens group, and each of said multifocal contact lenses of said second multifocal contact lens groups having an aspheric power profile that provides an area under the curve that is between 5% to 45% greater than an area under the curve of the relative aspheric power profile of the multifocal contact lenses of the first multifocal contact lens groups.

15. The method of claim 13, wherein the forming comprises designing the multifocal contact lenses to have the aspheric power profile in which the aspheric power profile of individual multifocal contact lenses of the plurality of multifocal contact lenses have a maximum rate of power change having an absolute value greater than 0.0 diopters/mm and less than 0.9 diopters/mm.

16. The method of claim 13, further comprising providing the plurality of multifocal contact lenses as lens pairs effective to provide an improved visual acuity to a presbyopic subject compared to the visual acuity provided to the presbyopic subject by either multifocal contact lens of the pair, alone.

17. The method of claim 13, wherein the forming comprises polymerizing the polymerizable composition in contact lens mold assemblies comprising a contact lens shaped cavity.

18. The method of claim 17, further comprising shaping a contact lens mold member insert to provide the optic zone of the plurality of the multifocal contact lenses, and forming a first contact lens mold member using the contact lens mold member insert, and placing the first contact lens mold member in contact with a second contact lens mold member to form a contact lens mold assembly.

19. The method of claim 13, wherein the forming comprises polymerizing the polymerizable composition in a mold to form a polymerized composition, and machining the polymerized composition into a multifocal contact lens of the batch.

20. The method of claim 13, further comprising packaging individual multifocal contact lenses into primary contact lens packages, and placing a single group of multifocal contact lenses, of either the first group, or the second group, into a secondary package, said secondary package comprising indicia identifying the single distance refractive power of the multifocal contact lenses of the group, and optionally, the Add power of the multifocal contact lenses of the group.

* * * * *